United States Patent [19]

Cahill et al.

[11] Patent Number: 4,588,296
[45] Date of Patent: May 13, 1986

[54] COMPACT OPTICAL GYRO

[75] Inventors: Richard F. Cahill, El Toro; Eric Udd, Huntington Beach, both of Calif.

[73] Assignee: McDonnell Douglas Corporation, Long Beach, Calif.

[21] Appl. No.: 309,254

[22] Filed: Oct. 7, 1981

[51] Int. Cl.[4] .......................... G01B 9/02; G01C 19/64
[52] U.S. Cl. ..................................... 356/350; 350/358; 350/96.15
[58] Field of Search ........................................ 356/350

[56] References Cited

U.S. PATENT DOCUMENTS 4,299,490 11/1981 Cahill et al. .......................... 356/350
4,342,517 8/1982 Johnson et al. ....................... 356/350
4,372,685 2/1983 Ulrich .................................. 356/350

Primary Examiner—Vincent P. McGraw
Attorney, Agent, or Firm—George W. Finch; John P. Scholl; Donald L. Royer

[57] ABSTRACT

An improved compact optical gyro is provided wherein a beam of light is split and introduced into both ends of an optic coil whose rotation is to be sensed. At least one frequency shifter is placed to affect the frequency of the beam to introduce or adjust a nonreciprocal phase shift. The beams are then mixed back together and the resultant beam is detected and analyzed by suitable circuitry to provide an output indicative of the rotation of the light path.

27 Claims, 61 Drawing Figures

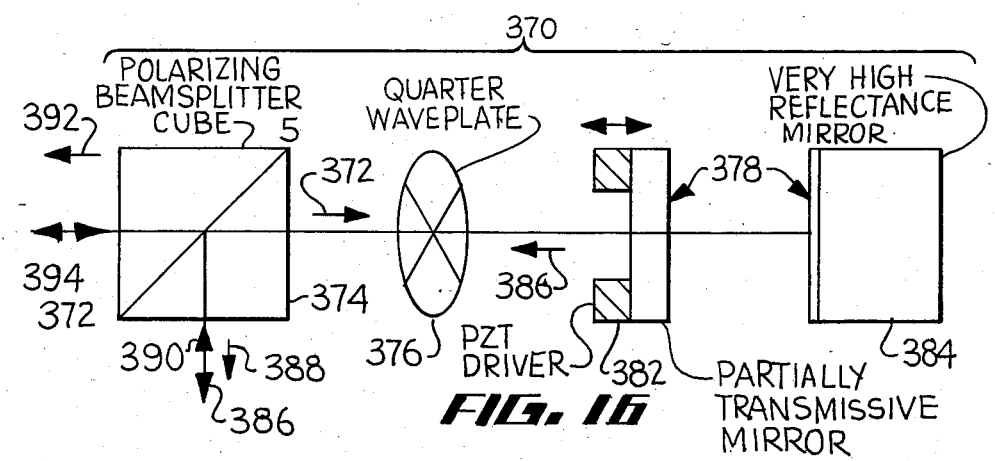
FIG. 16
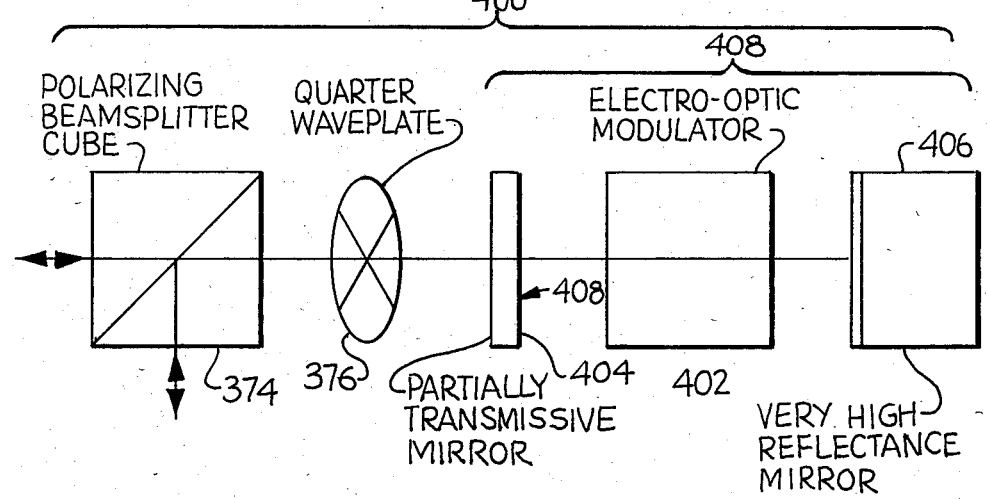
FIG. 17
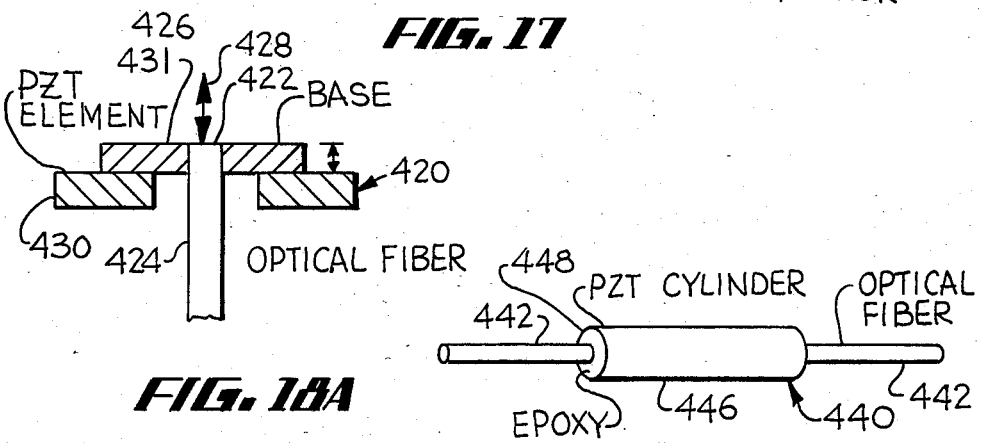
FIG. 18A
FIG. 19

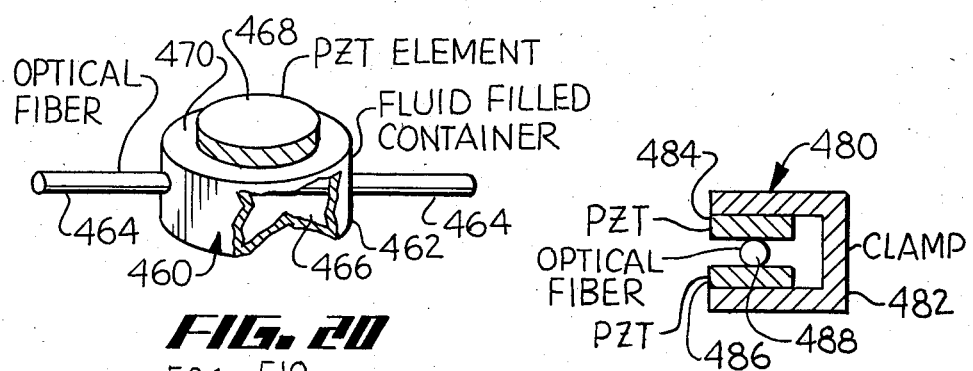
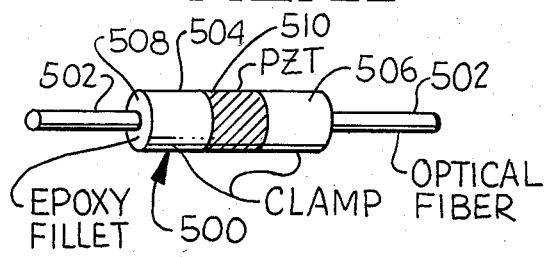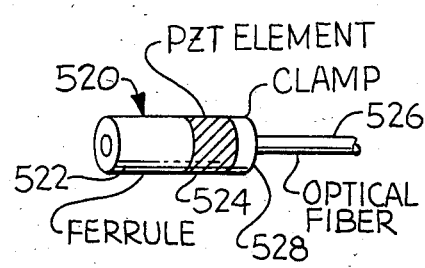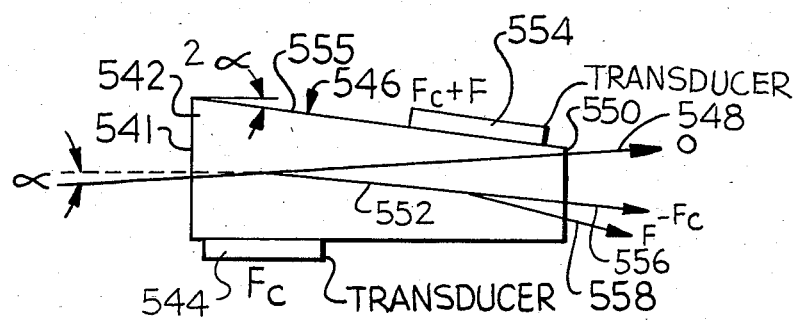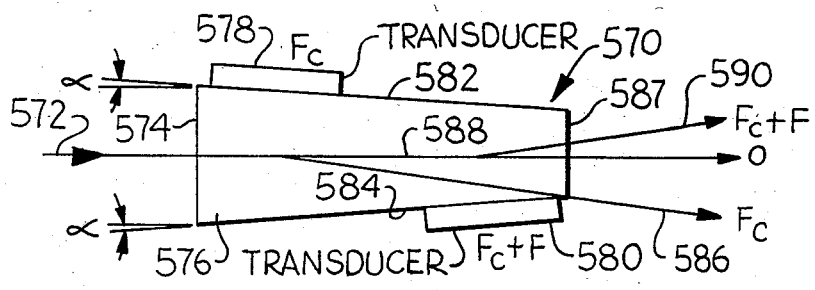

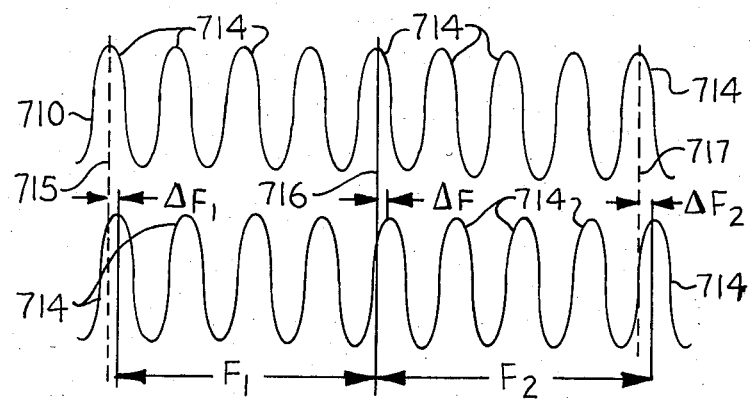
FIG. 29
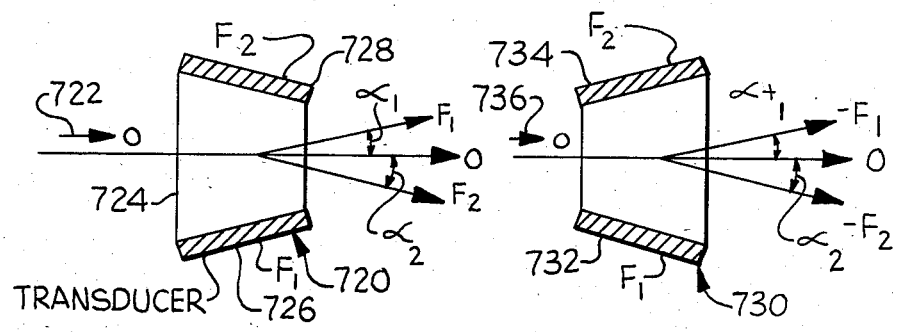
FIG. 30A  FIG. 30B
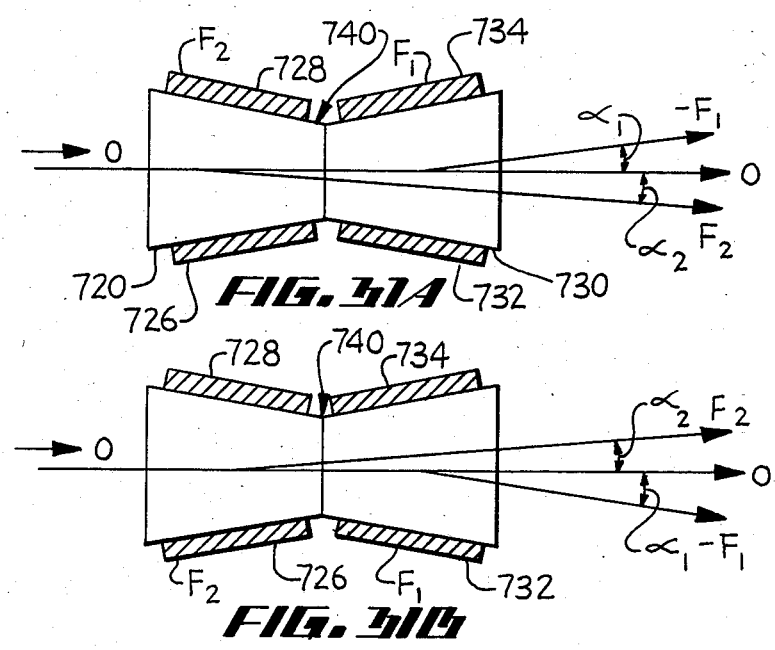
FIG. 31A
FIG. 31B

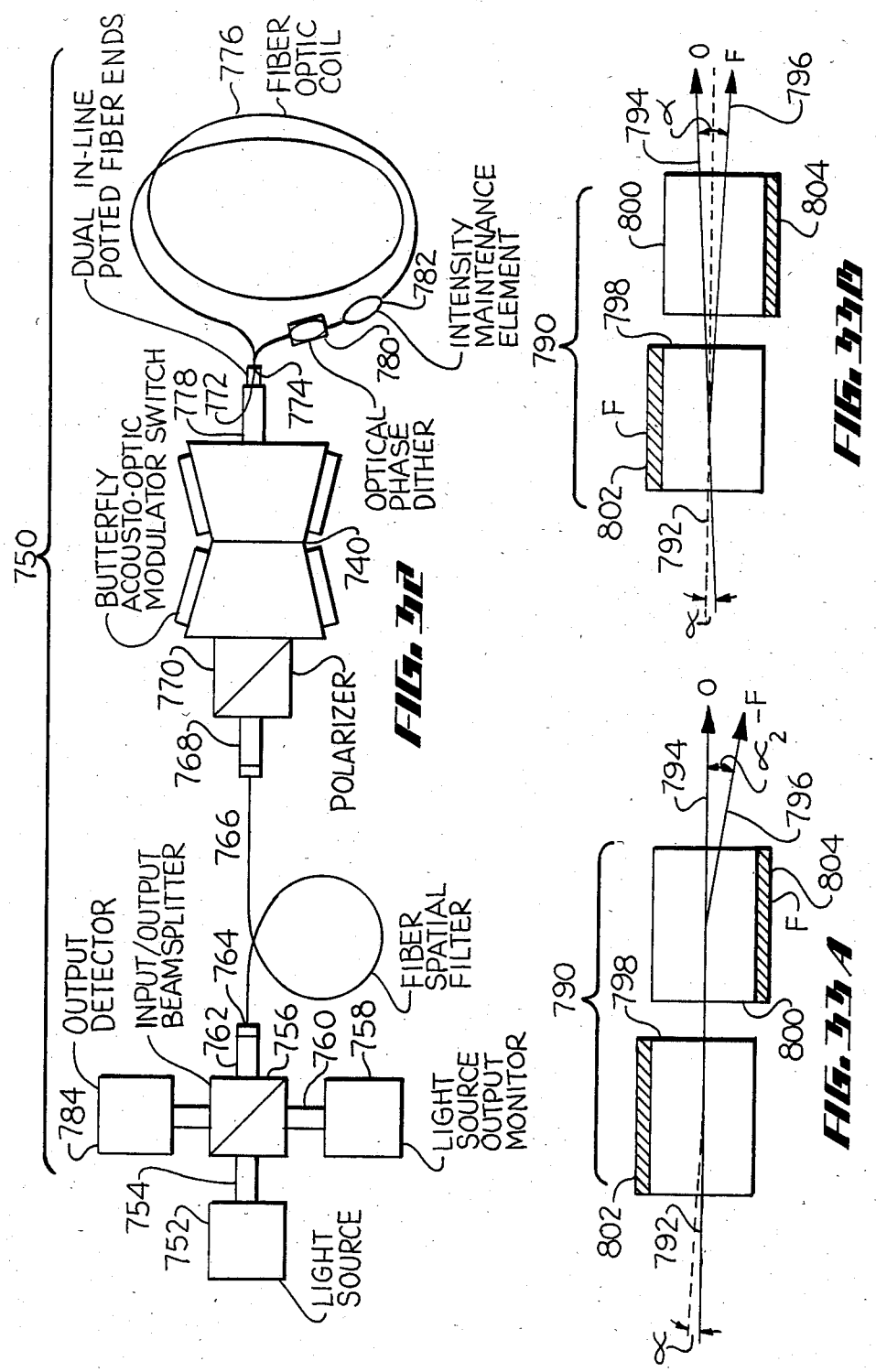

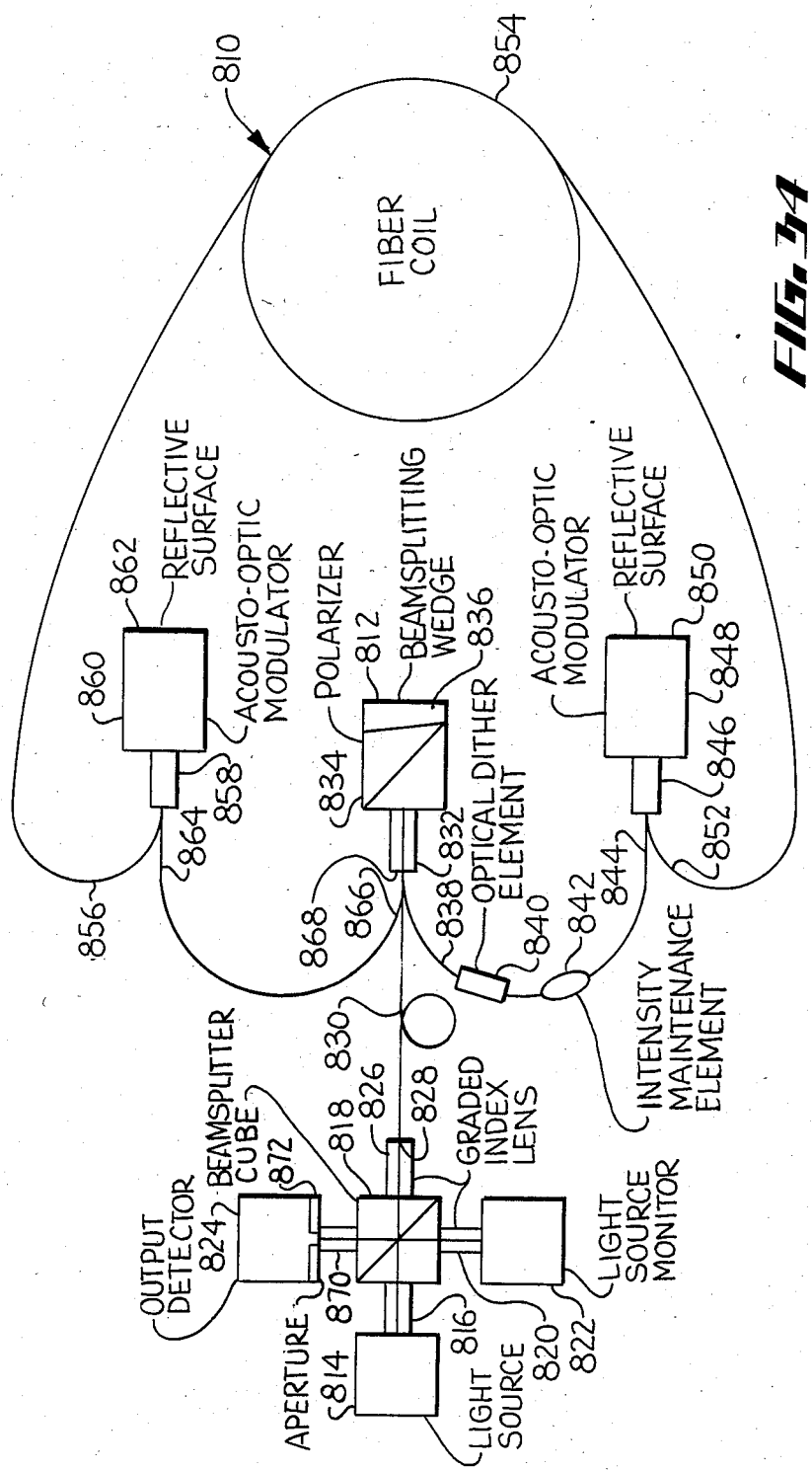

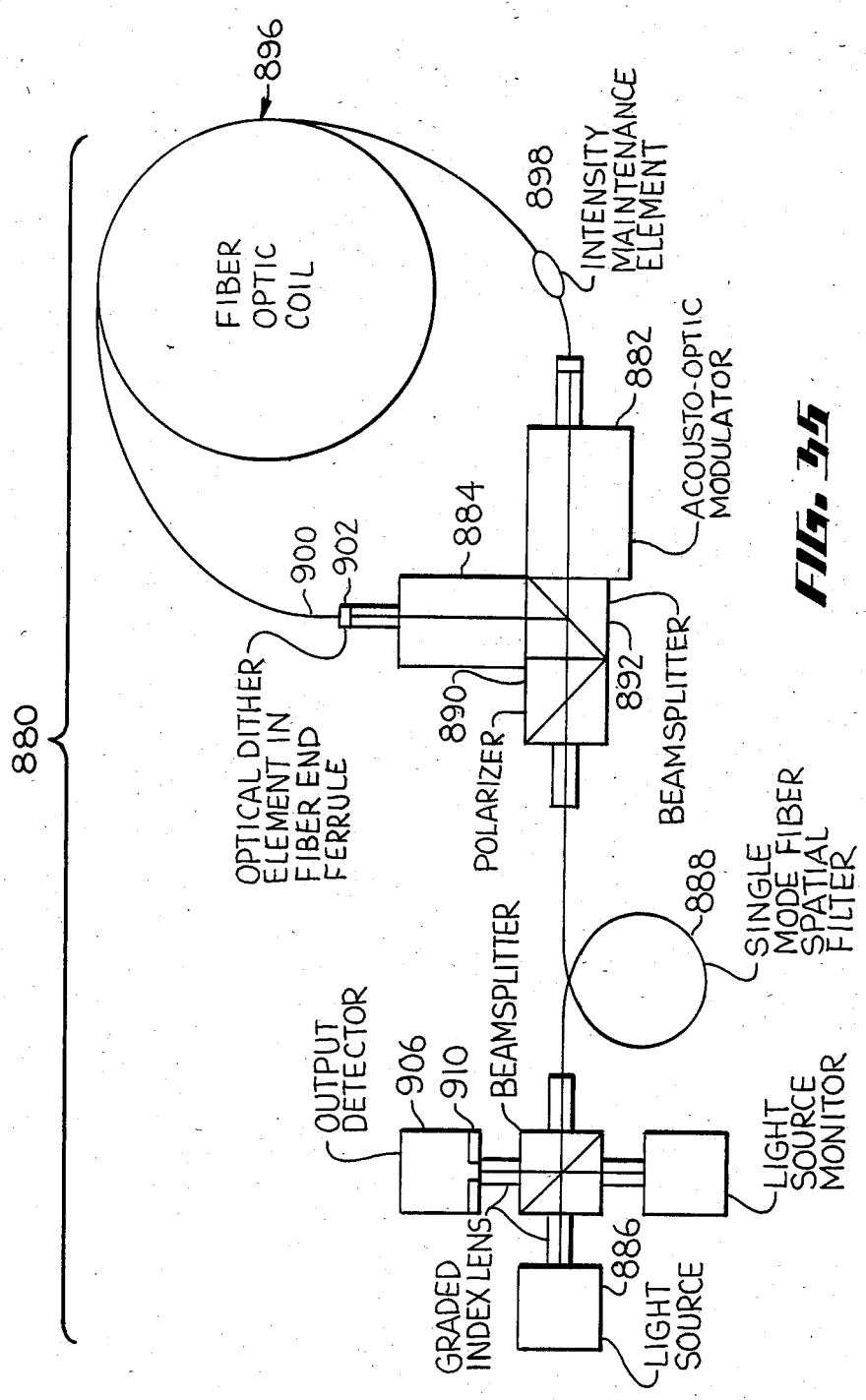

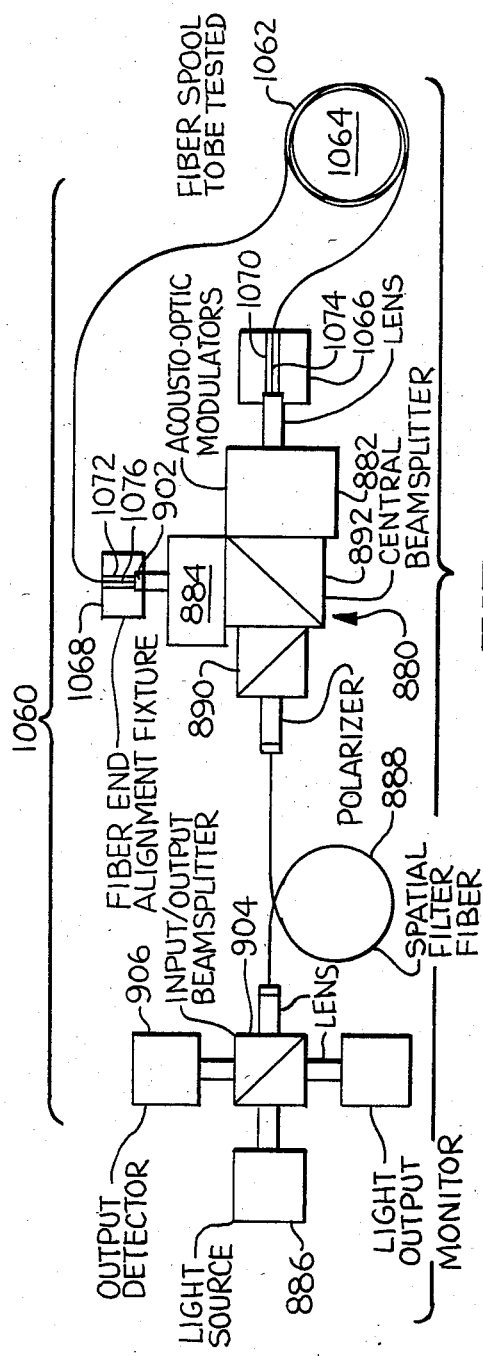
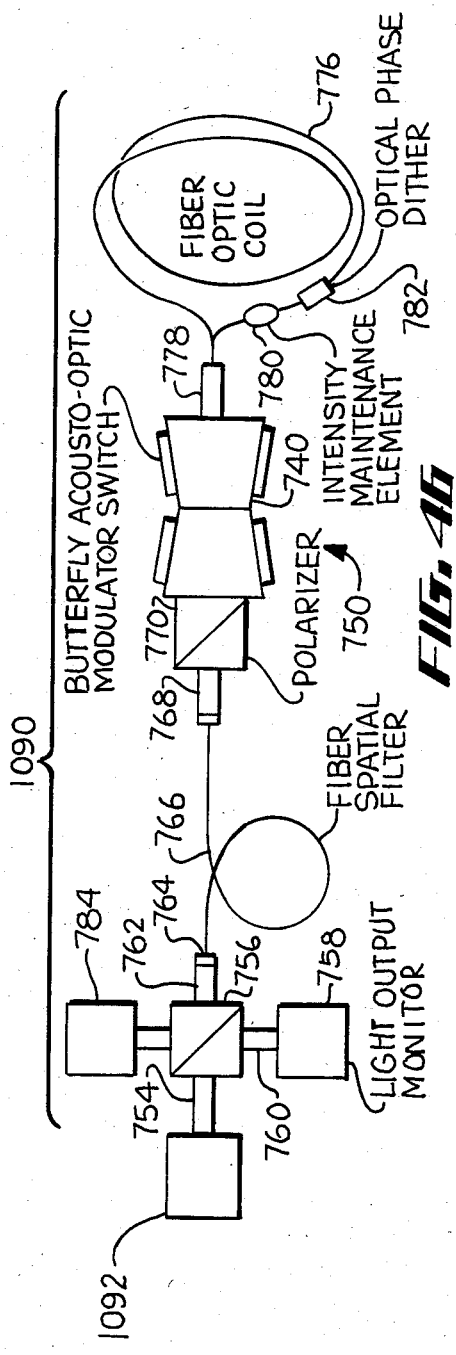

COMPACT OPTICAL GYRO

CROSS-REFERENCE TO RELATED APPLICATIONS

This Application is related to U.S. Pat. No. 4,299,490 issued 9 Nov. 1981, for "Phase Nulling Optical Gyro" and U.S. Pat. No. 4,375,680 issued 9 Nov. 1981 for "Optical Acoustic Sensor" both by Richard F. Cahill and Eric Udd, and assigned to Applicants' assignee, and those Applications are incorporated by reference as though fully set forth herein below.

BACKGROUND OF THE INVENTION

State-of-the-art mechanical gyros are available for most uses, but their high cost, long start up time, low reliability and problems associated with acceleration make implementation of solid state inertial sensitive systems such as optical gyros attractive. To be acceptable for a broad range of products, optical gyros must have a large dynamic range. For example, a gyro that is to be used in an inertial navigation system for a manned aircraft, sufficiently accurate to accomplish the functions of navigation, control and support of weapons delivery, and reconnaissance, should be capable of sensing a peak angular input rate of about 400°/sec. On the low end, its bias instability should be better than 0.01°/hr. This represents about eight orders of magnitude dynamic range and is a primary navigational grade optical gyro performance objective. Secondary, but still important performance goals are: scale factor errors consisting of scale factor stability, scale factor asymmetry and scale factor linearity of not more than 10 ppm; a sensitivity to acceleration which is not greater than 0.01°/hr/g; an allowable operating temperature of from −30° F. to 160° F.; axis alignment instability of not more than 10 arc seconds; and the ability to withstand linear accelerations up to 10 g.

Concepts for inertial sensing based on ring lasers have thus far exhibited the best performance. For example, a ring laser gyro is available which employs a mechanical method known as dithering to circumvent the lock-in problem characteristic of ring laser gyros at low rotation rates. Although this gyro has exhibited the best performance of those gyros presently available, the use of mechanical dithering forsakes the potential advantages of a genuine solid state system. This prior art gyro is also large and costly since it has unitized construction and requires ultra high quality optics. The other presently available ring laser gyro is based on a magneto-optic mirror which acts as an electronic bias away from the lock-in zone, allowing low rotation rate operation. It is smaller and less costly than the previously mentioned mechancially dithered ring gyro. However, its performance is not as good, its cost remains high and its prospect for cost reduction due to production economics appears low.

Other laser gyros have been proposed including ones wherein effort has been made to introduce a Faraday rotator as a bias element into the ring laser cavity. However, the extreme thermal and magnetic sensitivity of such a device makes it questionable as to whether it will ever be developed far enough to meet the performance requirements outlined above. There are also investigators in the art presently pursuing a multioscillator (four mode) ring laser concept based on the use of a quartz crystal to split right and left hand circularly polarized modes in frequency. Each of these modes is split once again by a Faraday element. Each set of circularly polarized light beams is then mixed to obtain a frequency output dependent upon rotation rate. While the multioscillator approach differs from the two commercially available gyros mentioned above, there does not appear to be any reason to expect substantial reductions in size and cost by adopting a system that is more complex in terms of optical components and eventual readout. It is unlikely in the future that any of the aforementioned optical gyros or concepts will meet the desirable attributes of having high accuracy, small size, and low cost.

U.S. Pat. No. 3,879,310 by Greenstein discloses a ring laser gyro based on a saturable absorber gas element within the ring cavity which offers potential advantages in that outstanding bias stability can be achieved through the action of the saturable absorber gas. Also, operation in the preferred 3.39 m line of helium-neon, which has extremely high gain, results in a potentially smaller, high performance ring laser gyro. Although Greenstein's ring laser gyro has potential competitive advantages over those currently in development, it suffers many of the same problems which characterize prior art ring laser gyros, namely long development time, the need for high grade and consequently expensive optics, and a fundamental size limitation due to the gain of the neon gas lasing medium.

Passive cavity laser gyro configurations unlike ring laser gyros have only recently been investigated primarily due to the late availability of single mode fibers of reasonably low attenuation. One such device utilizes the difference in bandpass generated by an etalon measured in two different directions by counterpropagating beams. Its shortcoming is it cannot meet the navigational grade gyro requirements because of limited q (or Finesse) in real etalons. With this last gyro as an exception, all known actively researched efforts in passive cavity laser gyros use counterpropagating beams which pass through a single mode fiber coil.

Some investigators have demonstrated that a fringe pattern can be generated through the mixing of two counterpropagating beams in a single mode fiber-optic coil. Rotational motion of the fiber coil results in a phase shift between the two beams and a consequent change in the intensity of the central fringe. One device uses relative intensity measurements to determine rotation rate and since it is difficult to make measurements of intensity to much better than 0.01%, the dynamic range of such a device is quite limited. Efforts by other groups have involved the development of means whereby the ability to read out the phase difference of counterpropagating beams can be enhanced. However, they are still fundamentally limited in dynamic range because they basically are analog measuring devices.

Phase nulling fiber-optic laser gyro schemes have been disclosed in the the article "Phase-Nulling Fiber Optic Laser Gyro" Optic Letters, Volume 4, Page 93, March 1979, by R. F. Cahill and E. Udd, "Solid-State Phase Nulling Optical Gyro", Applied Optics, Volume 19, Page 3054, 15 Sept. 1980, by R. F. Cahill and E. Udd, and "Techniques for Shot-Noise-Limited-Inertial Rotation Measurement Using a Multiturn Fiber Sagnac Interferometer" by J. L. Davis and S. Ezekiel published 13 Dec. 1978 in SPIE Volume 157, Laser Inertial Rotation Sensors. Those papers disclose early Phase-Nulling Fiber Optic Gyros which, although were shown to operate, had not yet been involved in the intensive development required to bring a concept to practical use, so that the problems inherent in ring laser gyros can be bypassed by adopting passive cavity techniques in applying fiber optics and avoiding the low sensitivity nonlinear, analog output, which otherwise limits their dynamic range to a much lower level than that achieved by ring laser gyros.

The previously disclosed Cahill and Udd gyro is a linear rotation sensor rather than sinusoidal sensor. It produces an inherently digital output via a frequency change proportional to rotation rate. This gyro uses the nonreciprocal phase shift resulting from an induced frequency difference between counterpropagating beams in a fiber-optic coil to null out nonreciprocal phase shifts due to rotation. Thus it has the potential for wide dynamic range, high sensitivity and linear rotation sensing. It also has an inherently digital output desirable for modern guidance systems. The present invention teaches various improved embodiments of this gyro.

From this brief overview of the prior art devices, two major conclusions can be drawn. Firstly, ring laser gyros which have been under development for eighteen years probably will not undergo substantial reductions in size or cost in the foreseeable future, and secondly, passive cavity laser gyros and in particular those based on fiber optics, offer little hope of obtaining the performance levels of the existing ring laser gyros without an inventive breakthrough. What has been required is a low-cost, solid-state laser gyro with a wide dynamic range capability so that in the long term its cost and size allows it to be a replacement for not only the high quality gyros presently required in inertial guidance systems but ultimately for all purposes in which an electrical inertia indicating signal is required.

BRIEF DESCRIPTION OF THE PRESENT INVENTION

In one of its simplest forms the present passive fiber-optic gyro includes a light source which is monochromatic, and coherent, at least in the way it is used. A beamsplitter acts on the beam from the light source to generate two counterpropagating beams into a fiber-optic coil. The counterpropagating beams exit the fiber-optic coil and are recombined by the beamsplitter upon rotation. There is a fringe shift between the recombined beams given by Equation 1

$$Z_R = \frac{2\Omega RL}{\lambda c} \quad (1)$$

where R is the radius of the fiber-optic coil, $\lambda$ is the wavelength, $\Omega$ is the rotation rate, L is the length of the fiber-optic coil, and c is the speed of light. The recombined beams are reflected onto a detector that monitors the fringe shift through cosinusoidal intensity changes due to the rotation. Although this device is simple, it has nonlinear, analog output, limited dynamic range, and is subject to errors due to intensity fluctuations of the output of the system.

To circumvent these problems, a nonreciprocal phase shift is introduced into the system that nulls out phase shifts due to rotation. If the light from the source is emitted at frequency $F_o$, and is split into couterpropagating beams by the beamsplitter the clockwise circulating beam of light passes through the fiber-optic coil at frequency $F_o$ while the counterclockwise beam circulates through the coil at frequency $F_o+F$, where F is introduced into the counterclockwise beam by a suitable frequency shifter. The relative fringe shift caused by the frequency difference of F between the two beams propagating in the fiber-optic coil is given by Equation (2)

$$Z_F = (F_{cw} - F_{ccw})t_D = -F t_D = \frac{-FLn}{c} \quad (2)$$

where $t_D$ is the time delay through the fiber coil and n is its index of refraction.

In order for the system to be nulled, the fringe shift due to rotation must be off-set by the fringe shift due to the frequency difference of the light beams counterpropagating through the fiber-optic coil. That is, the criterion for a nulled condition is stated by Equation (3)

$$Z_R + Z_F = 0 \text{ (or any integer value, when using an offset frequency)} \quad (3)$$

Combining Equations (1) and (2), results in Equation $$F = \frac{2\Omega R}{\lambda n} \quad (4)$$

To assure that the nulling condition of Equation (3) holds, an AC phase-sensitive detection scheme is included. Nonreciprocal phase shifts between the counterpropatating beams are introduced at a rate $\omega$. When the condition of Equation (3) holds, only the second harmonic of $\omega$ appears on the detector. Upon rotation of the system, a first harmonic signal of $\omega$ falls onto the detector with an amplitude and phase dependent upon rotation rate. This signal is synchronously demodulated, and the resultant output voltage applied to an integrator, which in turn corrects the output frequency of a voltage-controlled oscillator, closing the feedback loop and nulling the system.

The performance of the gyro is adversely affected by numerous components whose relative motion caused by vibration and mechanical flexing introduces error into the system. Therefore, in the present embodiments, this structure is constructed progressively toward a single rigid element.

Signal dropoff can occur if the state of polarization in the system is altered by changing birefringence in the fiber-optic coil due to temperature change. This contingency is dealt with by an intensity maintenance element consisting of a piezoelectric transducer element attached to one end of the fiber-coil at 45° to the linear vertical state of polarization of the system. This element is oscillated in a sinusoidal fashion at a frequency well above the output bandwidth of the gyro and adjusted in amplitude so that the induced additional birefringence in the fiber-optic coil causes one half of the light intensity to be in the correct polarization state on the average. Other systems can be constructed that maintain 70% or more of the light in the correct polarization state at the cost of increased complexity. Should polarization-preserving single-mode fiber become available in the future with performance and cost levels competitive with ordinary single mode fiber, these intensity maintenance elements will not be necessary, however.

Other satisfactory solutions to inaccuracies include: by appropriately placing a single-mode spatial filter and polarizer to guarantee reciprocity conditions of the light path, the gyro environmental sensitivity can be reduced; by heat sinking the acousto-optic modulator beam deflection due to thermal gradients can be prevented; by using the modulator in a beamsplitting mode, the optical efficiency of the system can be increased and at the same time the requirements on the modulator for optimum performance are greatly relaxed; by potting the ends of the fiber coil in a line, the acousto-optic modulator is allowed to operate in the beamsplitting mode and relative motion of these important positions is prevented; by using an optical phase dither element the electronics support package requirements are relaxed; and by providing extensive baffling and shielding, stray light is prevented from entering the detector. As will be shown hereinafter, the aforementioned improved configuration results in a fiber-optic gyro which can provide high performance in a small size and is producible at low cost to meet a variety of system requirements. It offers the high dynamic range and performance levels of ring laser gyros and also takes advantage of the cost and size reduction of parts developed for the fiber-optics communication field.

A series of sensors based on concepts developed in association with the gyro can be used to measure fiber length, determine light source output wavelength, measure magnetic fields, electric fields, acoustic signals, pressures, temperatures, accelerations or any environmental effect that can induce a nonreciprocal phase shift in an optical fiber.

It is therefore an object of the present invention to provide means for sensing inertial changes.

Another object is to provide an improved gyro device with a large dynamic capability and small error over a wide operating range of environmental temperatures, pressures and vibrational conditions.

Another object is to provide improved means to replace mechanical gyroscope based inertial guidance systems.

Another object is to reduce the cost of high performance inertial sensing devices by constructing such devices in small packages of solid state components.

Another object is to provide an improved inertial sensing device which can operate satisfactorily with presently available components and yet be adaptable for improved performance when better individual components are developed.

Another object is to provide a sensor for optical fiber length, wavelength or any environmental condition which can be made to induce a nonreciprocal phase shift in an optical fiber.

These and other objects and advantages of the present invention will become apparent to those skilled in the art after considering the following detailed specification which describes preferred embodiments thereof in conjunction with the accompanying drawings wherein:

BRIEF DESCRIPTION OF THE DRAWINGS

FIG. 16 is a diagrammatic view of a phase modulator employing an etalon with cavity spacing controlled by a movable partially transmissive mirror;

FIG. 17 is a diagrammatic view of a phase modulator employing an etalon with cavity spacing controlled by an electro-optic modulator;

FIG. 18A is a diagrammatic view of a phase modulator formed by a fiber end mounted in a base that can be driven by a piezoelectric element;

FIG. 19 is a diagrammatic view of a phase modulator formed by a section of optical fiber mounted in a piezoelectric cylinder and potted in place with epoxy;

FIG. 20 is a diagrammatic view of a phase modulator consisting of an optical fiber placed through a fluid filled container that exerts a pressure on the fiber proportional to the movement of a piezoelectric element;

FIG. 21 is a diagrammatic view of a phase modulator that exerts force on the fiber through the action of a piezoelectric actuated clamp;

FIG. 22 is a diagrammatic view of a phase modulator that exerts a force on the fiber by stretching it;

FIG. 23 is a diagrammatic view of an alternate phase modulator that stretches the fiber;

FIG. 24 is a diagrammatic view of a frequency shifter/beamsplitter;

FIG. 25 is a diagrammatic view of an alternate embodiment of a frequency shifter/beamsplitter;

FIG. 29 is a diagram used to illustrate how the phase-nulling optical gyro can be used to measure wavelength and eliminate bias drift due to dispersion;

FIGS. 30A and 30B are diagrammatic views of dual transducer acousto-optic modulator switches;

FIGS. 31A and 31B are diagrammatic views of a butterfly acousto-optic modulator switch;

FIG. 32 is a diagrammatic view of a compact phase-nulling optical gyro design employing a butterfly acousto-optic modulator switch;

FIGS. 33A and 33B are diagrammatic views of a dual in line acousto-optic modulator switch;

FIG. 34 is a diagrammatic view of an alternate embodiment of the improved compact optical gyro;

FIG. 35 is a diagrammatic view of a second alternate embodiment of the improved compact optical gyro;

FIG. 45 is a diagrammatic view of the elements of FIG. 35 arranged as an optical fiber length sensor;

FIG. 46 is a diagrammatic view of the elements of FIG. 32 arranged as wavelength sensor; and FIG. 47 is a diagrammatic view of the elements of FIG. 32 arranged as an environmental effect sensor.

DETAILED DESCRIPTION OF THE SHOWN EMBODIMENTS

Figure 1:
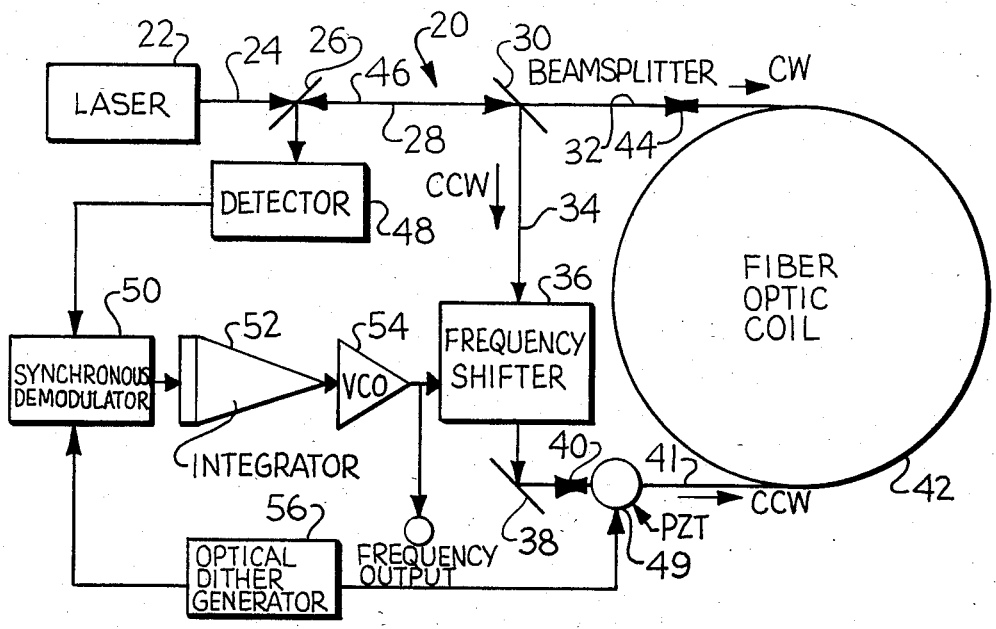
FIG. 1 is a block diagram of an improved compact optical gyro constructed according to the present invention.

Referring to the drawings, more particularly by reference numbers, number 20 in FIG. 1 refers to a simple form of passive fiber-optic gyro. The gyro 20 includes a suitable light source such as a laser 22 whose output is a beam of light 24 which may be at a single frequency, although broad band, and multiple light sources are also possible. The beam 24 is directed toward a beamsplitter 26 and passes therethrough as beam 28 to a second beamsplitter 30. The beamsplitter 30 divides the beam 28 into a clockwise (cw) beam 32 and a counterclockwise (ccw) beam 34. The ccw beam 34 is shifted in frequency by a frequency shifter 36 and then reflected by a mirror 38 onto the end 40 of a fiber 41 of a fiber-optic coil 42 which in certain instances can be replaced by a glass block with reflecting surfaces or a series of mirrors to provide an appropriate light path. The ccw beam 34 then passes through the coil 42 and is subjected to any rotation of the coil 42 having its phase delayed or advanced in relation to any rotation thereof. The ccw beam 34 thereafter exits the end 44 of the coil 42 onto the beamsplitter 30. The other beam, cw beam 32 enters the end 44 and travels about the fiber-optic coil 42 where it is subjected to phase shifting depending upon the rotation of the coil 42. The cw beam 32 exits the end 40 of the coil 42 onto the mirror 38 and is reflected through the frequency shifter 36 back to the beamsplitter 30. The beamsplitter 30 recombines the beams 32 and 34 into a combined beam 46 which is reflected by the beamsplitter 26 onto a detector 48.

Figure 2:
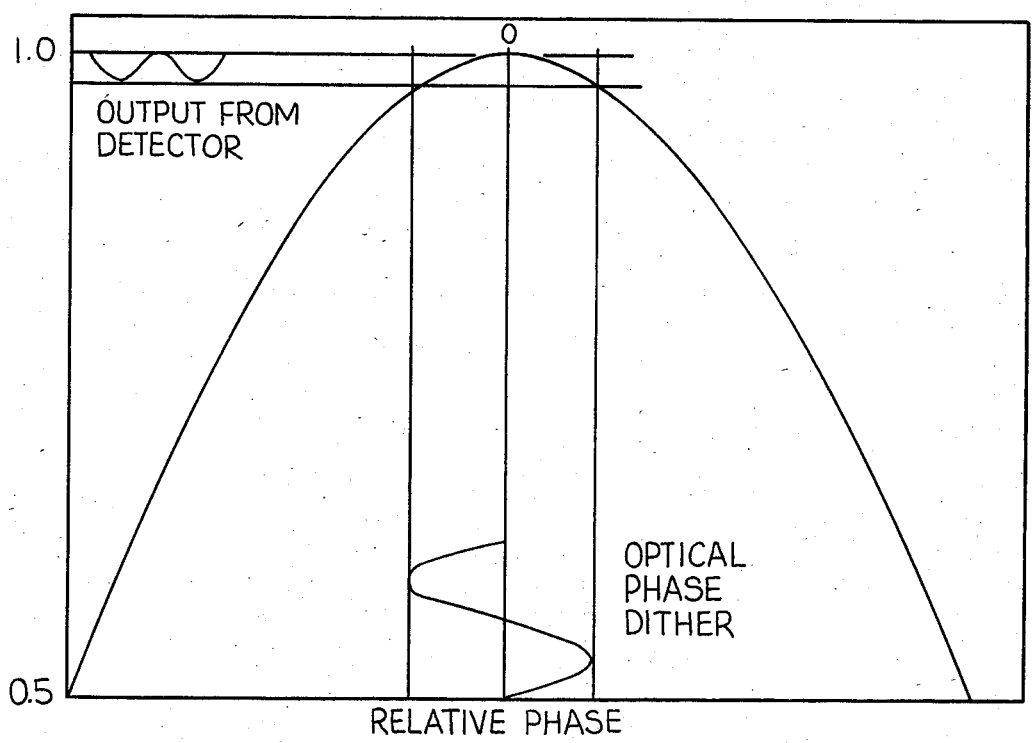
FIG. 2 is a graphical representation of signals detected during open loop operation of the present gyro with no rotation.
Figure 3:
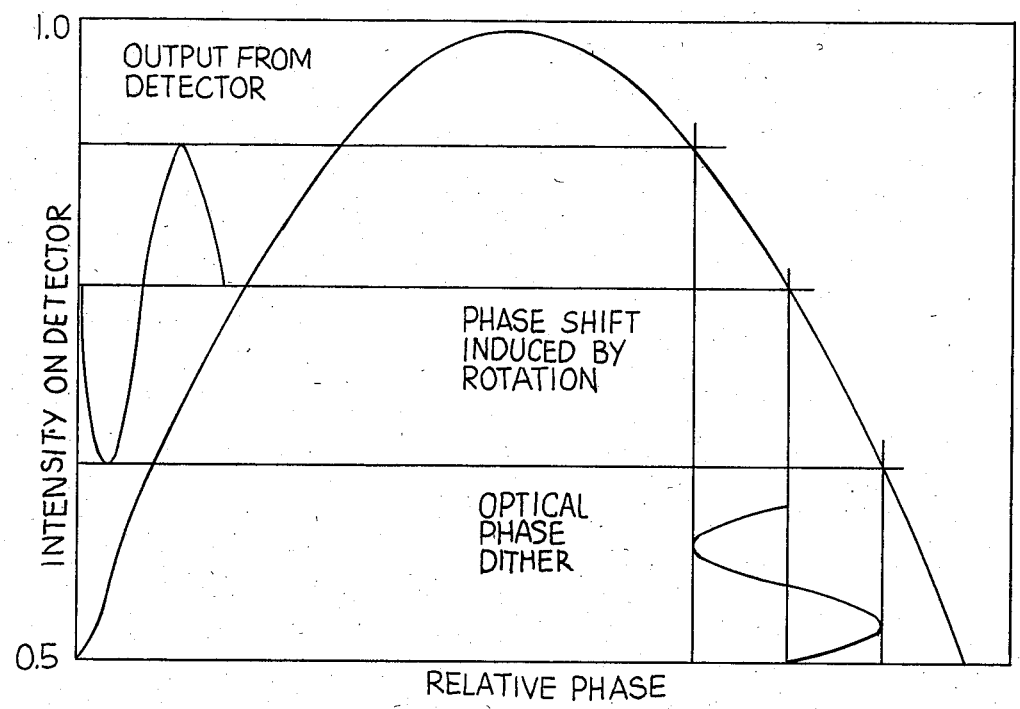
FIG. 3 is a graphical representation of signals detected during open loop operation of the present gyro with rotation.

If the light from the laser 22 is admitted at frequency $F_o$ and if the frequency shifter 36 adds a frequency F to the frequency of the ccw beam 34, then the beam 32 circulating clockwise within the coil 42 passes through the coil 42 at frequency $F_o$ while the ccw beam 34 circulates through the coil 42 at frequenc $F_o+F$. Beams 32 and 34 recombine on the beamsplitter 30 at frequency $F_o+F$ and the relative fringe shift caused by the frequency difference of F between the two beams propagating through the fiber-optic coil is given by Equation (2) above. In order for the system to be nulled, the fringe shift detected as amplitude changes on the detector 48 must be offset by the fringe shift due to the frequency difference of the light beams 32 and 34 counterpropagating through the fiber-optic coil 42. That is the criterion for a nulled condition as defined by Equation (3) above. To insure that the nulling condition of Equation (3) holds, an A/C phase sensitive detection scheme is employed. The nonreciprocal phase shifts between the beams 32 and 34 are introduced at a rate $\omega$ through the action of a phase dither element 49 (which may be a piezoelectric element, a Faraday effect coil or other phase generating device) element 49 attached near one end 40 of the fiber coil 42. When the condition of Equation (3) holds, only the second harmonic of $\omega$ appears on the detector 48 as illustrated by FIG. 2. Upon rotation of the coil 42 a first harmonic signal at $\omega$ falls onto the detector 48 with an amplitude and phase dependent upon rotation rate as shown in FIG. 3. The signal out of the detector 48 is applied to a synchronous demodulator 50 whose resultant output voltage is applied to an integrator 52, which in turn corrects the output frequency of a voltage-controlled oscillator 54. The voltage-controlled oscillator 54 produces a frequency output which is the output of the system and also the control frequency for the frequency shifter 36. The phase dither element 49 is driven by an optical dither generator 56 which also produces a synchronizing signal to the synchronous demodulator 50.

Figure 4:
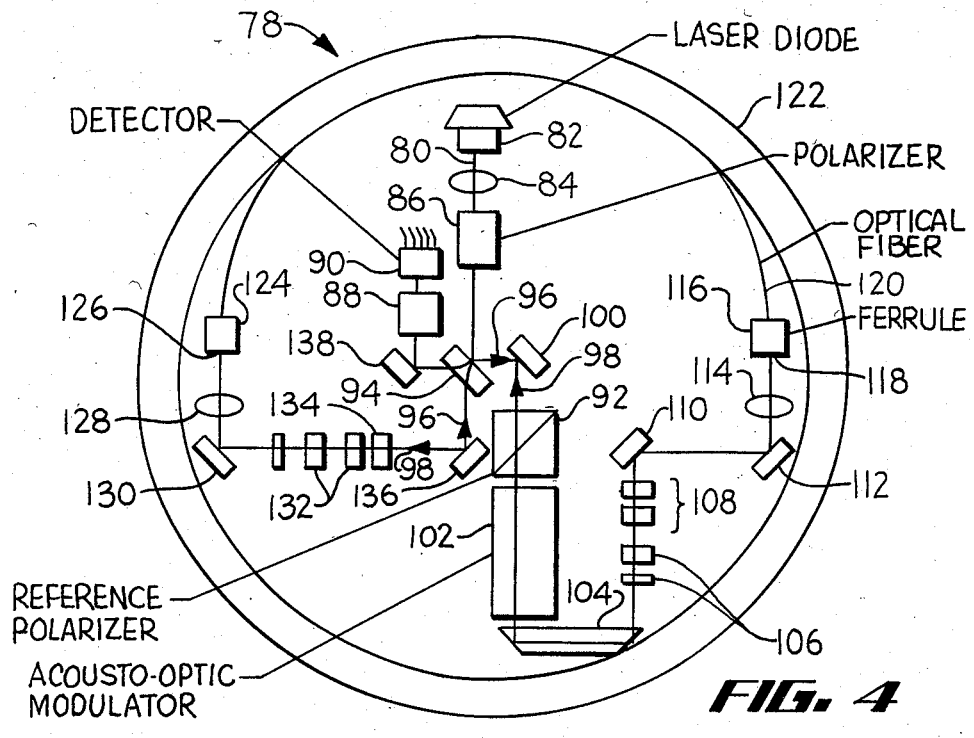
FIG. 4 is a schematic diagram of a five-inch-diameter, one-inch-thick gyro.

A typical gyro 78 constructed according to the present invention is shown embodied in a 5" diameter 1-inch thick package in FIG. 4. A light beam 80 is generated by a single mode, single-frequency laser diode 82 in the p-polarization state and is collimated and apertured down by a lens system 84. The beam of light 80 then passes through a rotatable polarizer 86, eliminating residual s-polarization in the beam 80. A second rotatable polarizer 88 is positioned in front of the output detector 90 of the gyro 78 which polarizer 88 is aligned to match the state of the input polarizer 86 with a reference polarizer 92. This procedure establishes a single polarization throughout the gyro 78 and reduces the sensitivity of the gyro 78 to environmental effects. The beam 80 hits a beamsplitter 94 at which point counterpropagating beams 96 and 98 are established. Beam 96 is directed by means of a mirror 100 and the aforementioned reference polarizer 92 to an acousto-optic modulator 102 where it is frequency shifted. The frequency shifted beam 96 then passes through a prism 104 that internally reflects it into a set of steering wedges and waveplates 108. The wedges 106 are used to control the orientation of the light beams passing therethrough while the waveplates 108 are used to control the state of polarization of the beam. The light beam 96 is then reflected off mirrors 110 and 112 before being focused by a lens system 114 onto a ferrule 116 which supports the end 118 of an optical fiber 120 which is formed into a fiber-optic coil 122. The fiber-optic coil 122 is the passive sensing element of the gyro 78. The light beam 96 propagates counterclockwise through the fiber coil 122 and exits by means of a ferrule 124 on the other end 126 of the fiber 120. The ccw beam 96 is then recollimated by a lens system 128 and is directed by a mirror 130 through a set of optical wedges 132 and waveplates 134 like wedges 106 and waveplates 108. Again, the wedges control the orientation of the light beam relative to the fiber end 126 and the waveplates control the state of polarization of the beam 96. After passage through the wedges 132 and waveplates 134, the ccw beam 96 is reflected by a mirror 136 to the central beamsplitter 94 where it is reflected onto a mirror 138 through the rotatable polarizer 88 and onto the detector 90. The second beam 98 circulates in the opposite direction through the system, passing through the coil 122 in a clockwise direction and mixing with the ccw beam 96 on the beamsplitter 94 to produce the desired fringe shifts.

Figure 5:
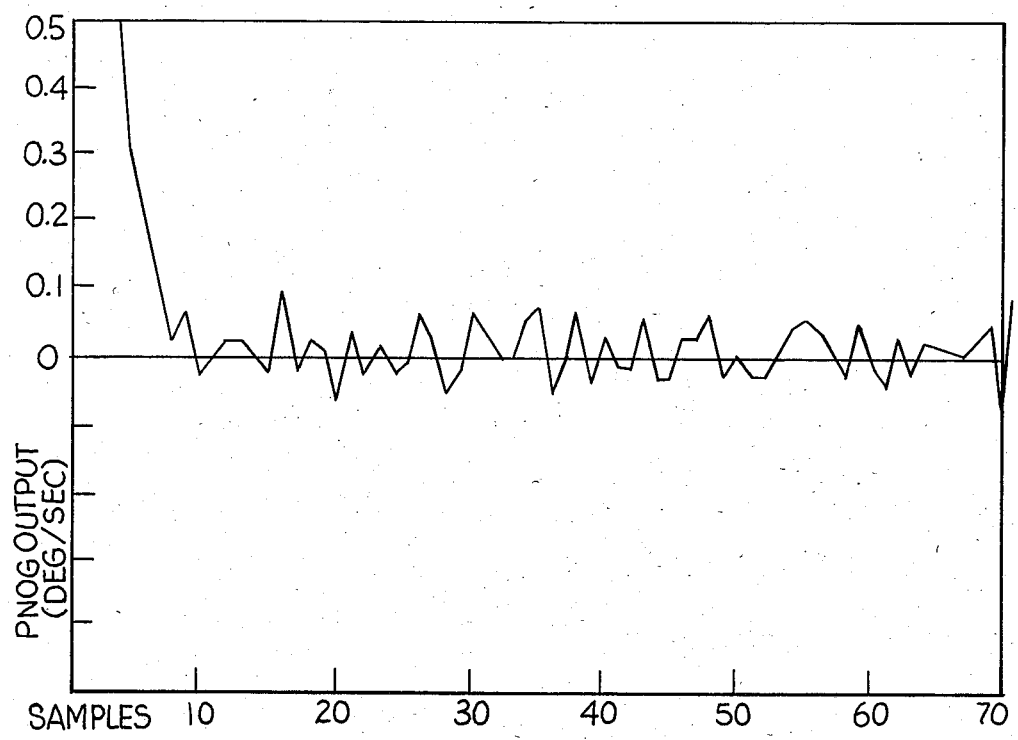
FIG. 5 is a graph of output in deg/sec versus time for the null noise level of the gyro constructed according to FIG. 4.
Figure 6:
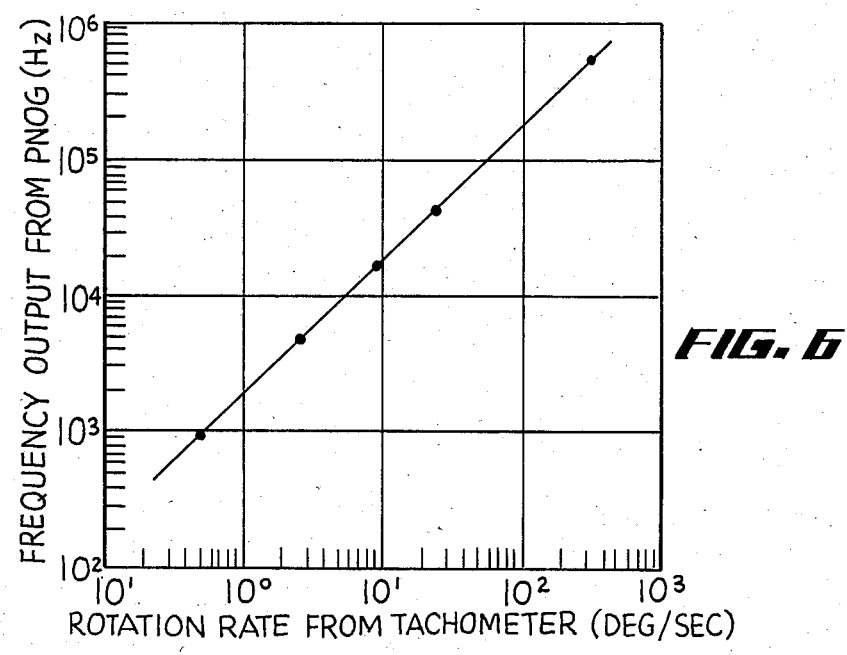
FIG. 6 is a graph of frequency output in Hz versus rotation rate in deg/sec of the gyro of FIG. 4.
Figure 7:
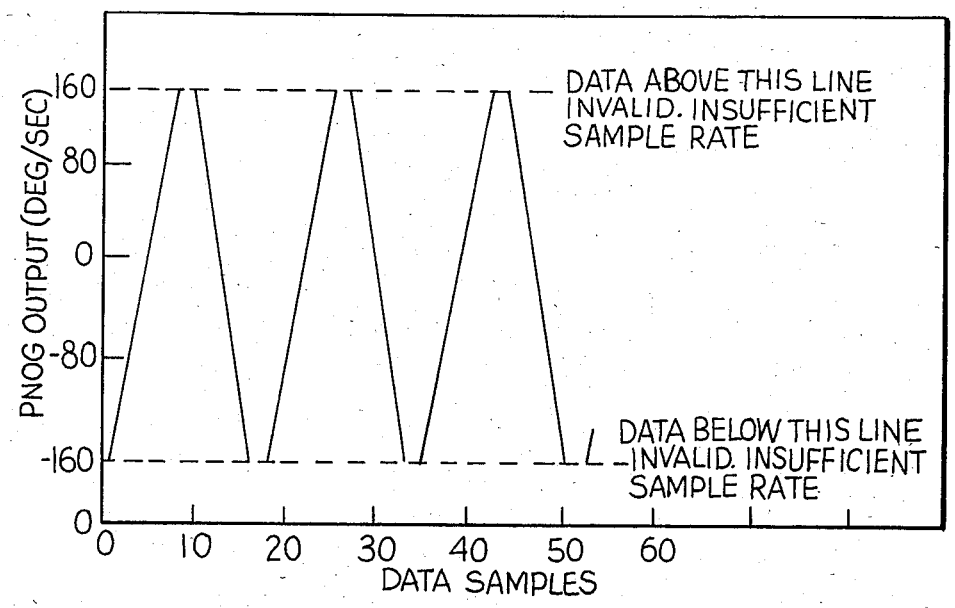
FIG. 7 is a graph of gyro output in deg/sec versus data samples with a triangular rate drive of the gyro of FIG. 4.

Tests of gyro 78 have included an assessment of dynamic range, null noise level, scale factor, linearity, acoustic sensitivity, magnetic sensitivity, and bias drift. Additional testing and modification of the gyro 78 has been performed in an effort to identify and minimize residual error sources so that current systems operate over a dynamic range of about 100°/hr (null noise levels have an RMS value of about 100°/hr, as seen in FIG. 5) to 400°/sec. FIG. 6 plots the frequency output of the gyro 78 versus rotation rate as determined by a tachometer mounted on a rate table on which the gyro 78 was spun. The data was taken by driving the rate table with a square wave input, that is, a constant rate clockwise, followed by an equal and opposite rate counterclockwise. The difference between the two conditions was taken as the rate output generated by the gyro 78 and the tachometer. A second test involved driving the rate table with a triangular rate input waveform. The output of the gyro 78 was plotted with separate lines connecting each succeeding data point. The tips of the triangles are clipped since the sampling rate, which was 7/sec, could not resolve the rapid turnover at the peaks. This data is shown in FIG. 7. In both tests, scale factor and linearity were found to be consistent within less than 1%, this limit being imposed by uncertainty in the tachometer readout.

A series of tests was conducted to determine the effects of acoustic noise and magnetic fields on the gyro 78. In the case of acoustic noise, a 4-inch loud-speaker was set up adjacent the gyro 78 and run at 90-dB levels over the full frequency range of the speaker with no observable effects of the output. The speaker was then placed directly on the gyro 78, and the procedure repeated. The gyro 78 resonated at 1,390 and 2,780 Hz, producing an observable sinusoidal perturbation at these frequencies at the output signal. However, this did not produce a rate error caused by rectification. The resonance effect is believed to be strictly mechanical in nature and could be reduced with better packaging techniques. Furthermore, it is well above the maximum frequency response required for a gyro, such as gyro 78, which typically is several hundred Hz. An attempt was made to induce a perturbation of the output signal by various placements of a small 1,000-gauss magnet on the gyro 78. Particular attention was devoted to the fiber-optic coil 122, but no measurable effect was observed.

Figure 8:
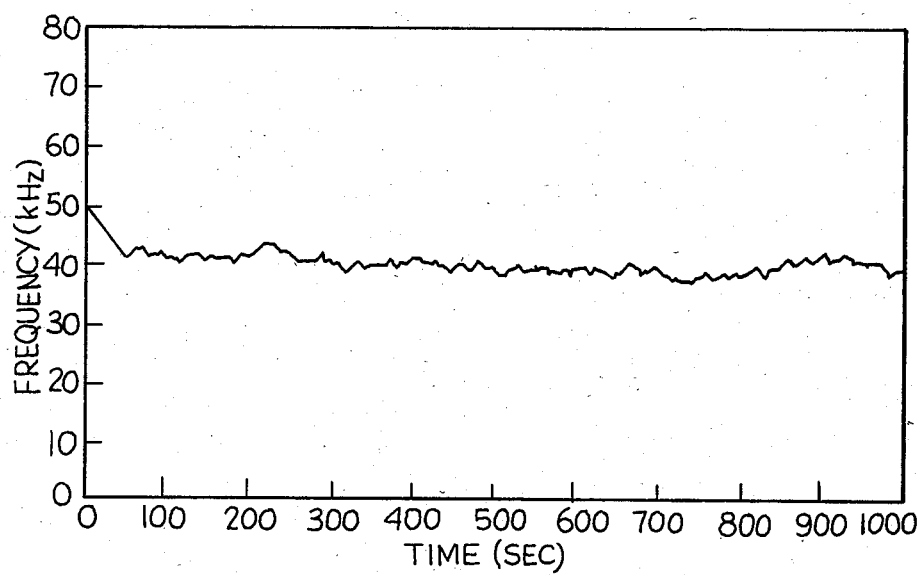
FIG. 8 is a graph of frequency in kHz versus time showing the long-term bias drift of the gyro of FIG. 4.
Figure 9:
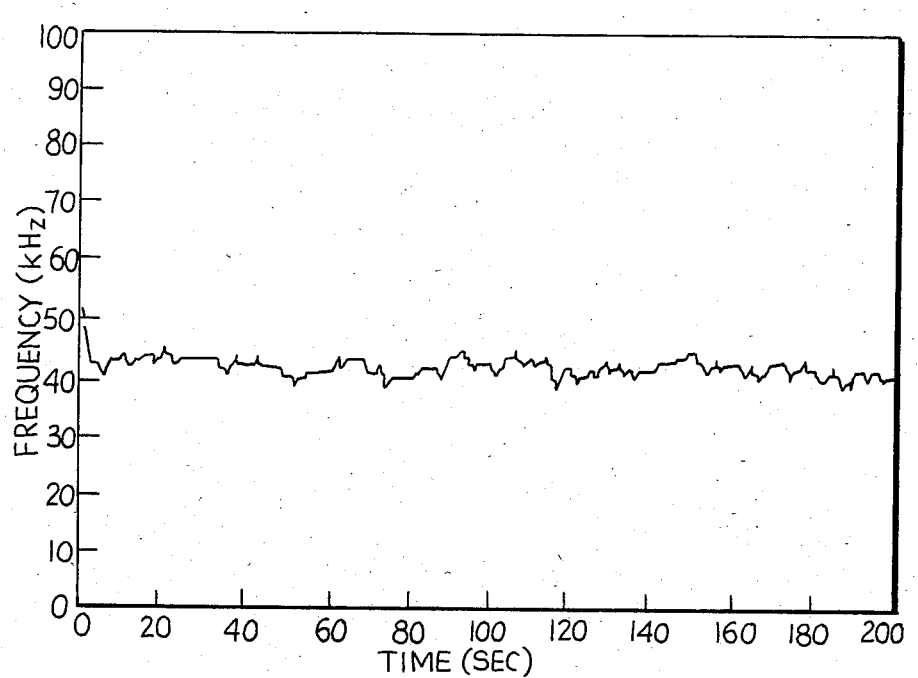
FIG. 9 is a graph of frequency in kHz versus time in seconds for the short-term bias drift of the gyro of FIG. 4.

Measurements were made of bias drift rates for an integration time of 0.5 sec over 200 sec, as shown in FIG. 9. A substantial portion of the noise evident in FIGS. 8 and 9 was caused by quantization error in the digital volt meter used to record the measurements; however, the long-term drift is a characteristic of the gyro 78. These residual bias drifts are dependent upon such factors as temperature and mechanical misalignment in the optical package.

The residual error sources of the gyro 78 were subjected to extensive studies and experimental investigations. Based on these results, the gyro 150, shown in FIG. 10, which was designed to a 2.5-inch-diameter, 0.65-inch thick package, was developed. In the gyro 150, light from a single-mode, single-frequency laser diode 152 is collimated by a lens system 154 and passes through an output beamsplitter 156. The light beam is focused by means of a second lens system 158 onto the end 160 of a fiber spatial filter 162. The purpose of the fiber spatial filter 162 is to eliminate all the undesirable modes and establish a clean, especially well defined, single mode in the light beam. After passage through the filter 152, the light beam exits at the opposite end 164 thereof and is recollimated by a lens system 166. A polarizing beamsplitter cube 168 then serves the dual function of establishing a single polarization state in the light beam (and in the case of this special example, an s-polarization state) as well as acting as a mirror to direct the beam into the acousto-optic modulator 170. The acousto-optic modulator 170 splits the beam into a frequency shifted first order beam and a zeroth order beam. Each of these beams is focused by a lens system 172 onto the opposite ends 174 and 176 of a fiber-optic coil 178 that are potted in a fixture 180. Although it does not make a substantial difference which order beam is used, for this example, the zeroth order split light beam propagates into the end 174 of the fiber 182 of the fiber coil 178 and passes an intensity maintenance element 184 which scrambles the state of polarization and ensures the signal level of the system is maintained at a non-zero value. The intensity maintenance element 184 becomes unnecessary if polarization preserving fiber is employed in the coil 178. The light beam in the fiber coil 178 then passes an optical dither element 186 that generates a sinusoidal signal used for detection as described above in association with FIGS. 1 through 3. The light beam circulates through the fiber coil 178 in the counter-clockwise direction after passing through a fiber crossover 188 required to solve a layout design problem which otherwise would require fiber bend of too sharp a radius. The ccw beam exits the opposite end 176 of the coil 178 at the ferrule fixture 180, where it is recollimated by the lens system 172 and directed by the acousto-optic modulator/beamsplitter 170 back into the fiber spatial filter end 164 by means of the polarizing beamsplitter cube 168 and the lens system 166. The light beam passes back through the fiber spatial filter 162, exits the end 160 thereof and is recollimated by the lens system 158. The light beam then reflects off the beamsplitter 156 and is focused down through an aperture 190 by a detector lens system 192 and detector mirror 194 onto the output detector 196. A second beam circulates through the gyro 150 in the clockwise direction commencing with the first order beam out of the acousto-optic modulator 170 and recombines in the acousto-optic modulator 170 to form a beam which is a mixture of the counterclockwise and clockwise rotating beams and contains the rotationally induced phase information.

Figure 10:
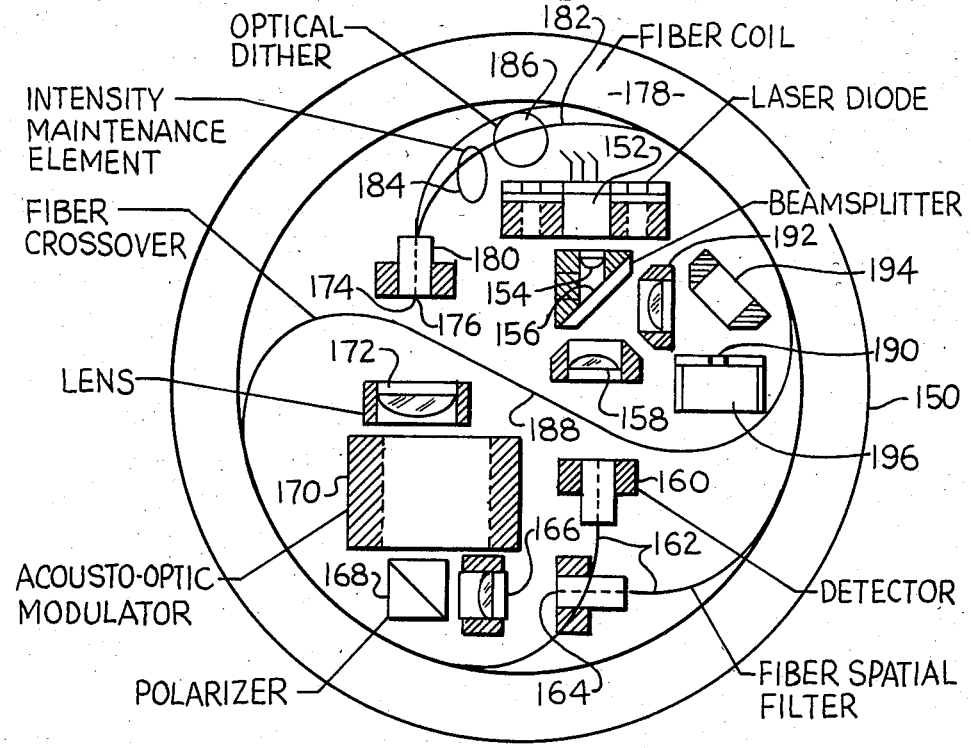
FIG. 10 is a schematic diagram of a 2.5-inch-diameter, 0.65-inch thick gyro constructed according to the present invention.

As can be seen in FIG. 10, there is a reduction of component count by approximately a factor of 2 over gyro 78 shown in FIG. 4. This count reduction in combination with greatly reduced separation between key components and rigid potting of each element to thick alignment plates (not shown) minimizes misalignments caused by vibration and mechanical flexing.

Figure 10A:
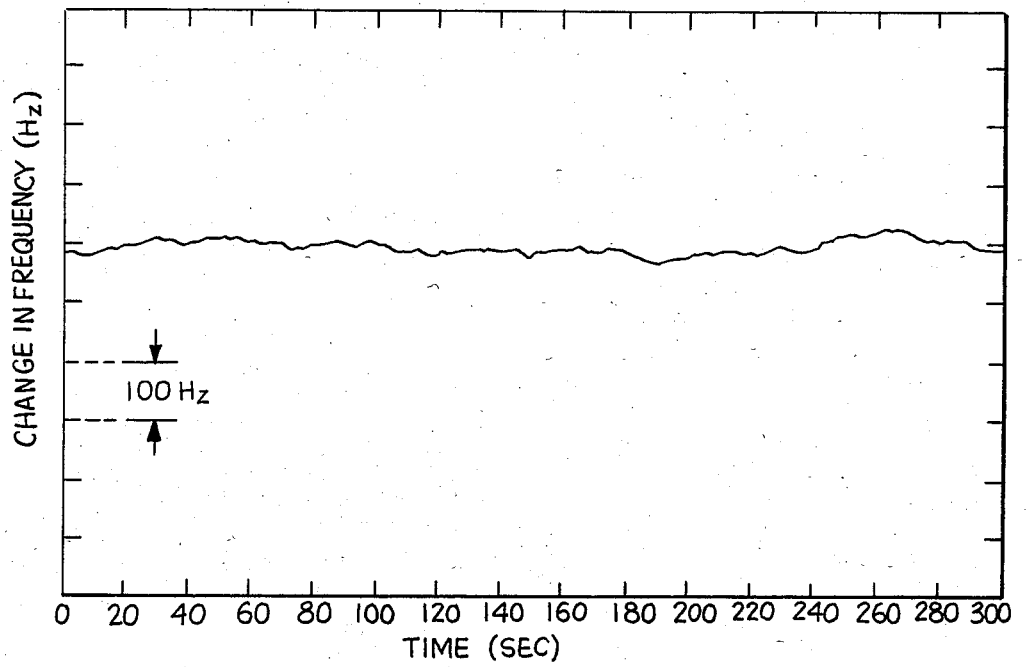
FIG. 10A is a graph of frequency in Hz versus time in seconds for the short-term bias drift of the gyro in FIG. 10 using a 100 meter 2.5-inch diameter fiber coil.
Figure 10B:
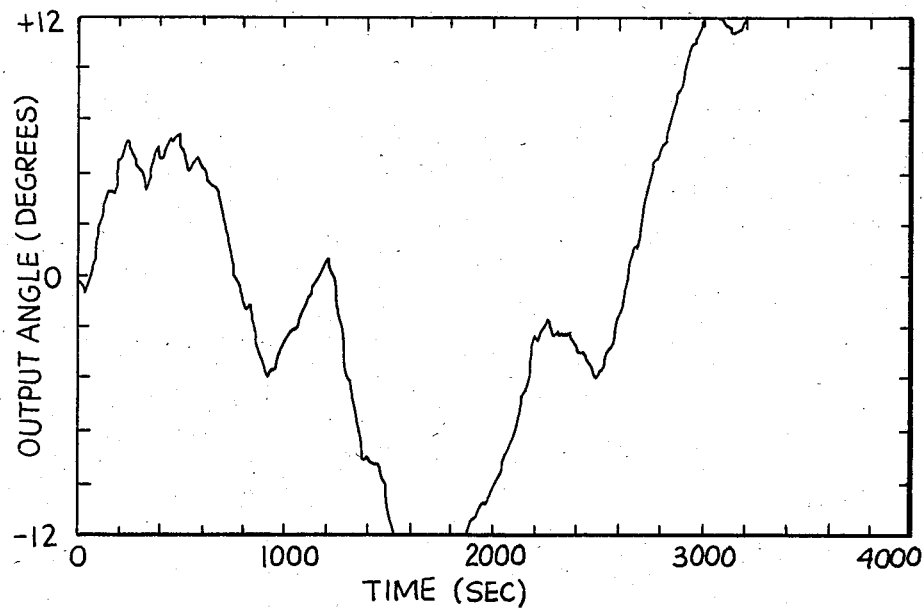
FIG. 10B is a graph of angular drift in degrees versus time in seconds for long term bias drift of the gyro in FIG. 10 using an 1100 meter, 6-inch diameter fiber coil.
Figure 10C:
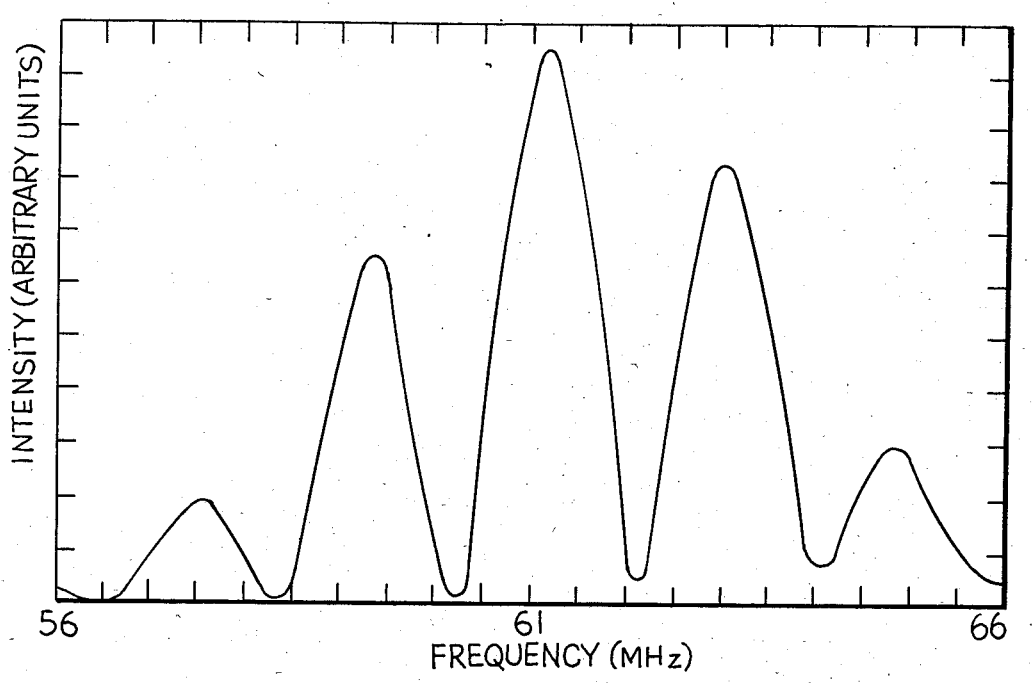
FIG. 10C shows the output intensity on the detector of the gyro in FIG. 10 using a 100 meter, 2.5-inch diameter fiber coil as a function of frequency.
Figure 10D:
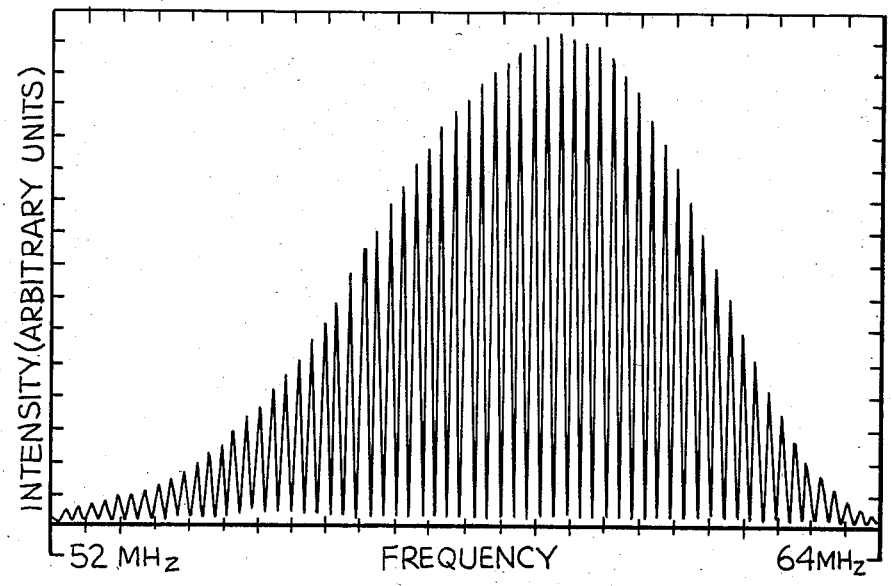
FIG. 10D shows the output intensity on the detector of the gyro in FIG. 10 using an 1100 meter, 6-inch diameter fiber coil as a function of frequency.

The gyro of FIG. 10 has been the subject of extensive testing. In general it is about two orders of magnitude better than the five inch gyro 78 shown in FIG. 4 in terms of reduced environmental sensitivity. The remaining error terms due to environmental effects are largely due to wavelength drift and can be compensated or eliminated by the procedures that follow. FIG. 10A is a graph of frequency output of the gyro 150 of FIG. 10 using a 100 meter, 2.5-inch diameter fiber coil 178 during a 300 second bias drift test. FIG. 10B illustrates the results of a 4000 second bias drift test by plotting the change in heading angle versus time. For this test the 2.5-inch fiber coil 178 was replaced by an 1100 meter 6-inch diameter fiber coil to increase sensitivity. It can be seen that bias drift has been reduced to about 12° per hour. No attempt was made to control temperature and most of the residual drift is attributable to wavelength change of the output of the laser diode 152 with temperature. FIG. 10C illustrates the output on the detector 196 of the gyro 150 as the frequency of the acousto-optic modulator 170 is scanned. In this case the 100 meter fiber coil 178 was used which in fact can be determined by noting that the separation between adjacent fringes is given by c/Ln where c is the speed of light in vacuum, L is the length of the fiber coil, and n is the index of refraction of the fiber. If the length of fiber on the coil 178 is known, the separation between fringes can be used to monitor wavelength as n is a function of wavelength. FIG. 10D illustrates the power of this technique using an 1100 meter fiber coil. Note the eleven fold increase in fringes over the same frequency span. Thus, the phase-nulling optical gyro 150 provides means to measure the length of optical fiber in a coil of unknown size if the input wavelength is known. Conversely, if the length of the fiber coil is known, the wavelength of the source can be determined. These capabilities are of considerable importance to users of fiber optics and in particular the telecommunication industry.

Figure 10E:
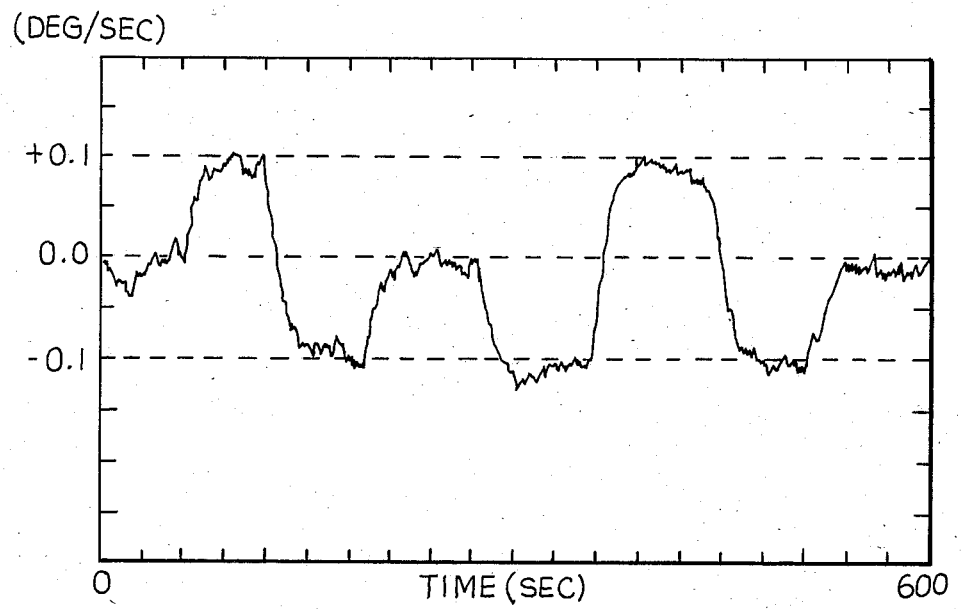
FIG. 10E shows the response of the gyro in FIG. 10 using an 1100 meter, 6-inch diameter fiber coil to a 0.1 deg/sec input rotation rate.
Figure 10F:
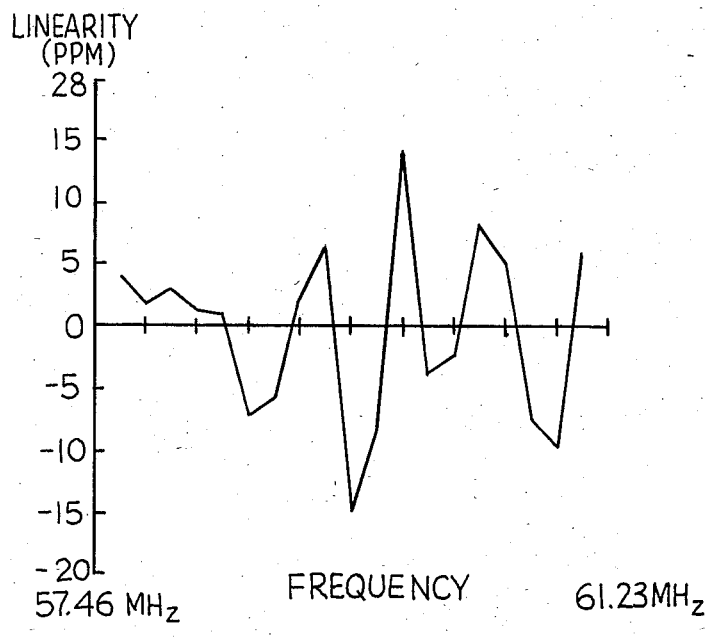
FIG. 10F shows the linearity of the gyro in FIG. 10 using an 1100 meter, 6-inch diameter fiber coil as a function of frequency.

FIG. 10E shows the response of the gyro 150 of FIG. 10 to a 0.1°/sec input rotation rate using the 1100 meter 6-inch diameter fiber optic coil. FIG. 10F illustrates the linearity of the gyro 150 over a frequency range of about four MHz. The residual nonlinearity is believed to be due to bias drift over the measurement period.

Signal dropoff can occur if the state of polarization of a system is altered by changing birefringence in the fiber-optic coil due to temperature change. This contingency is dealt with in the gyro 150 by the intensity maintenance element 184 consisting of a piezoelectric element attached adjacent the end 174 of the fiber coil 178 at 45° to the linear vertical state of polarization of the system defined by the polarizing beamsplitter cube 168. This element is oscillated in a sinusoidal fashion at a frequency well above the gyro output bandwidth and adjusted in amplitude so that the induced additional birefringence in the fiber-optic coil 178 causes one half of the light intensity to be in the correct polarization state on the average. It is also possible to use alternate methods to preserve high signal levels. In general, conventional single-mode fiber may be thought of as a long, weak, birefringent waveplate. The birefringence of the fiber may have been produced during the drawing process or induced by stress placed on the fiber by environmental effects. In particular, the overall birefringence of the fiber may change as environmental fluctuations occur resulting in time-dependent polarization rotation and conversion.

The basic idea behind the alternate intensity maintenance schemes taught herein is that environmental polarization state changes can be alleviated by artificially inducing compensating changes in birefringence. In general, an arbitrary coherent polarized state can be converted to any other polarized state through appropriate placement of quarter- and half-waveplates in series. Since it is possible to create an effective variable quarter- or half-waveplate by applying pressure over a short length of the optical fiber, the state of polarization can be controlled to whatever level is deemed appropriate at the expense of greater complexity.

Figure 10G:
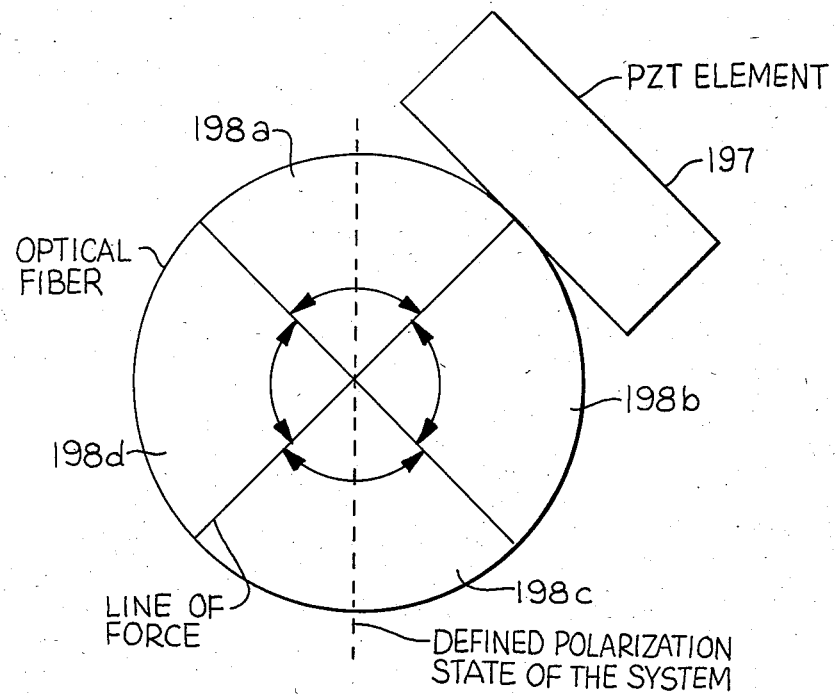
FIG. 10G is a schematic diagram of a single element two state intensity maintenance element.

As an example, consider a single piezoelectric element 197 aligned at 45° with respect to the defined polarization state of the system. For simplicity the piezoelectric element 197 is run in only two states: an off state with no voltage applied that does not alter the state of polarization, and an on state with an applied voltage V that converts the length of the fiber 198 controlled to an effective half-waveplate. If an arbitrary elliptical polarization state is propagating through the intensity maintenance element 197 of FIG. 10G and if the major axis of the polarization state lies in quadrants 198a and 198c, the system is left in the off position as this is the preferred polarization state of the system. Should the major axis lie in quadrants 198b and 198d, the system is switched on and the half-waveplate rotates the major axis of the polarization into the preferred first and third quadrants. For the special case of complete circular polarization, neither the on nor off position is preferred, and 50% of the light intensity is maintained in either case. The polarization is kept in the preferred state by periodically sampling the intensity of the system with the piezoelectric element 197 in the on and off states. The state that provides the highest intensity level is selected. Thus, a simple single element, two-state system may be used to preserve at least 50% of the system light intensity.

Figure 10H:
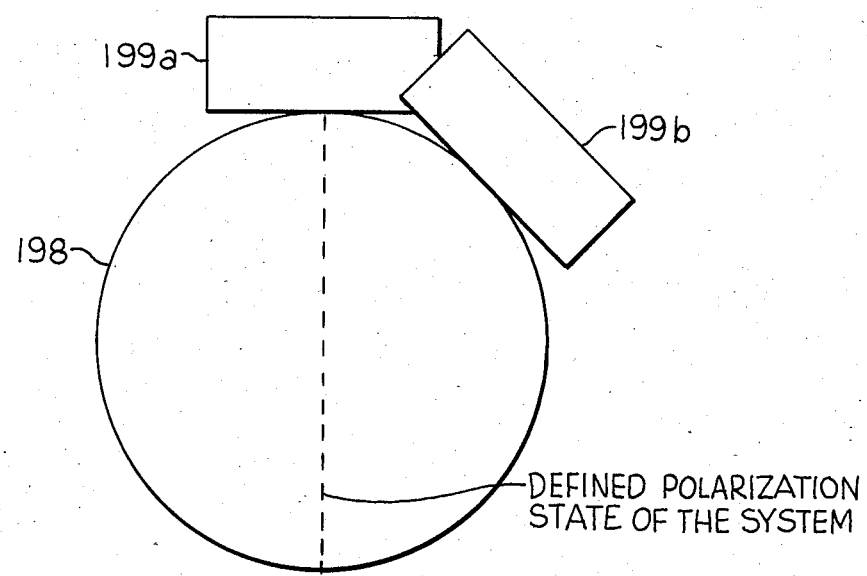
FIG. 10H is a schematic diagram of a multiple element, multiple state intensity maintenance element.

Higher performance may be achieved by adding additional elements and allowing multiple or continuous states. As an example, two piezoelectric elements 199a and 199b may be placed in series as shown in FIG. 10H. The first piezoelectric element 199a is aligned with the polarization state of the system which is taken to be linear vertical. The second piezoelectric element 199b is aligned at 45° with respect to the first element 199a. Each of the piezoelectric elements 199a and 199b is stimulated with 0, ±V/2, and ±V volts to cause the fiber to assume off, quarter- and half-waveplate states. If a voltage V results in a half-waveplate state, V/2 closely simulates a quarter-waveplate state. By sampling the allowed states of these two elements 199a and 199b and selecting the maximum intensity level, the intensity level of the system can be held at more than 70%. Should polarization-preserving single-mode fiber become available in the future, with performance and cost levels competitive with ordinary single mode fiber, the intensity maintenance element 184 will not be required. In the meantime these techniques are satisfactory solutions which permit the use of presently available single mode fiber.

Through the appropriate placement of the single-mode spatial filter 162 and the polarizer 168, reciprocity conditions of the light path are guaranteed, reducing environmental sensitivity. The acousto-optic modulator 170 preferrably is heat sinked to prevent beam deflection due to thermal gradients therein. By using the modulator 170 in a beamsplitting mode, the optical efficiency of the gyro 150 is increased, and requirements on the modulator 170 for optimum performance are greatly relaxed. The ends 174 and 176 of the fiber coil 178 are potted in line allowing the acousto-optic modulator 170 to operate in the beamsplitting mode and preventing relative motion of these important positions. The optical phase dither element 186 is introduced to relax electronic support package requirements and extensive baffling and shielding, not shown, can be provided into the package to prevent stray light from entering the detector 196.

Figure 11:
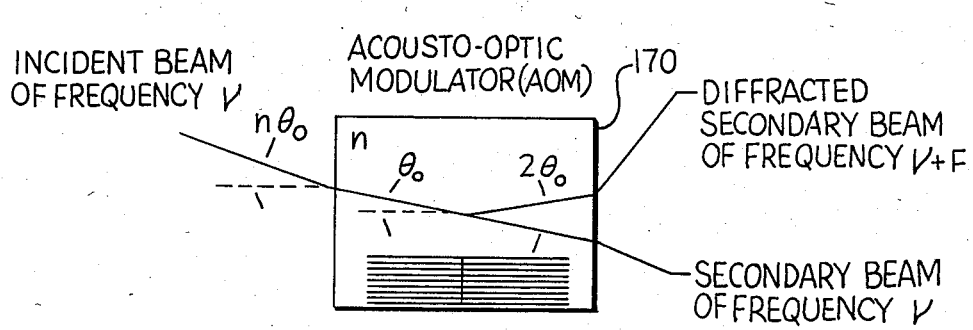
FIG. 11 is a diagrammatic view showing the operation of a typical acousto-optic modulator in the present gyro systems.

To understand how the splitting and mixing occurs, the acousto-optic modulator 170 is shown in greater detail in FIG. 11 which illustrates the basic functions of the acousto-optic modulator 170. An incident beam at frequency $\nu$ is split into two light beams, the zeroth order beam which passes through the modulator 170 without deflection and at the frequency $\nu$, and the first order beam that is deffracted at the Bragg angle and has been shifted in frequency to $\nu+F$, where F is the frequency of the sound field.

Figure 12:
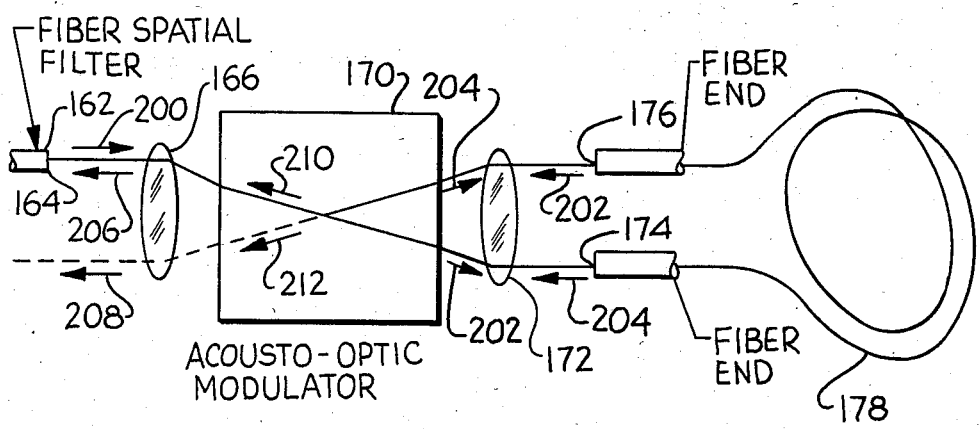
FIG. 12 is a diagrammatic top view of a single pass acousto-optic modulator configuration for the gyro of the present invention.

FIG. 12, shows how the acousto-optic modulator 170 is used in the dual roll of a beamsplitter and frequency shifter in the gyro 150. The fiber spatial filter 162 acts as an input/output lightport. In particular, the light beam 200 enters the acousto-optic modulator from the end 164 of the fiber spatial filter 162 and is collimated and directed by the lens system 166 at the Bragg angle into the acousto-optic modulator 170. The acousto-optic modulator 170 causes the light beam 200 to be split into a zeroth order beam 202 and a frequency shifted first order beam 204. The zeroth order beam 202 enters the lens system 172 and is focused onto the end 174 of the fiber coil 178. The light beam 202 then enters the fiber coil 178 and exits the fiber end 176. The light beam 202 is then collimated by the lens system 172 and reenters the acousto-optic modulator 170 at the Bragg angle. A portion of the light beam 202 is frequency shifted and is forwarded back into the fiber spatial filter 162 by the lens system 166 as light beam 206. The other portion 208 of the light beam 202 is not frequency shifted by the acousto-optic modulator 170 and leaves the system as light beam 208.

The other portion of the light beam 200 is frequency shifted, diffracted at twice the Bragg angle, and becomes beam 204. Beam 204 enters the fiber coil 178 at its end 176 and circulates in a direction that is opposite to beam 202. The beam 204 exits the fiber coil 178 at the end 174 and is directed into the acousto-optic modulator 170 by the lens system 172. A portion 210 of the beam 204 passes directly through the acousto-optic modulator 170 without being frequency shifted or diffracted and is focused by the lens system 166 back into the fiber spatial filter, the other portion 212 is down-shifted in frequency, diffracted, and exits the system as shown. Note that the light beams 206 and 210 have been frequency shifted by the same amount, but that the light beam 206 was frequency shifted after passage through the fiber coil 178 while beam 210 was frequency shifted before passage through the fiber coil 178. Thus beams 206 and 210 were of different frequency in the fiber coil 178 but mix in the fiber spatial filter 162 as light beams of the same frequency. Consequently, the rotationally induced phase information impressed upon these light beams can be extracted. It is also possible to use the mixed light beams 208 and 212 as an output as the light beam 208 has not been frequency shifted and the light beam 212 is shifted up before entering the fiber coil 178 and is shifted down to become light beam 212 so that beams 212 and 208 are of the same frequency and can be compared in phase.

Figure 13:
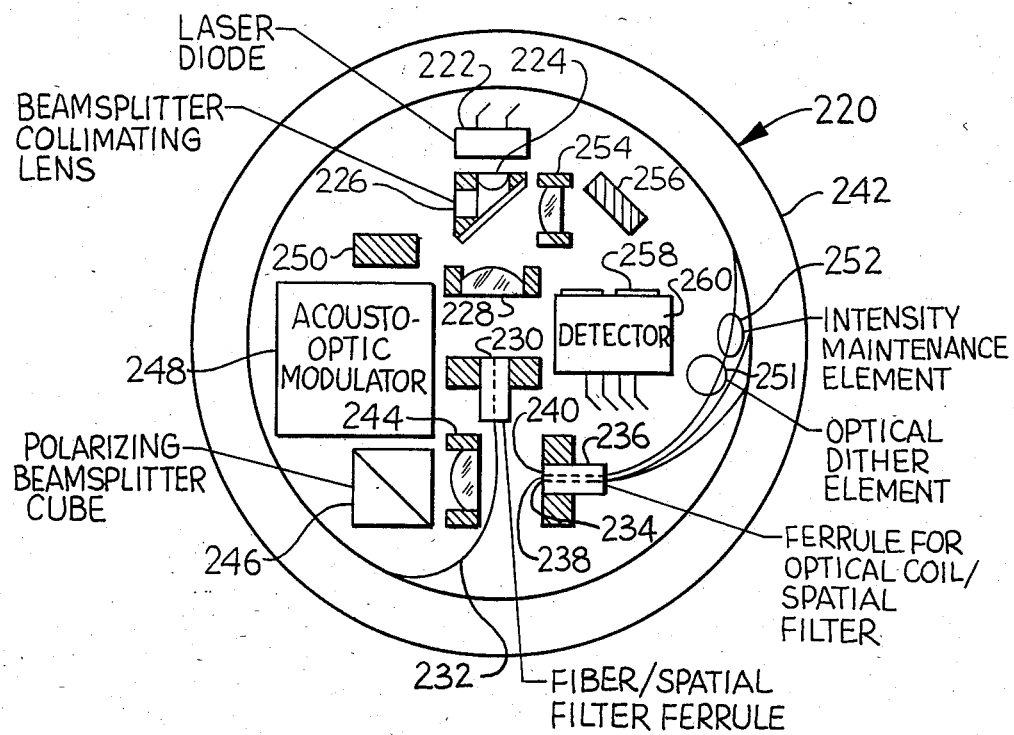
FIG. 13 is a diagrammatic view of a somewhat more compact optical gyro than that shown in FIGS. 4 and 10, utilizing a reflective mode layout.

In FIG. 13, an even more compact gyro 220, which uses an acousto-optic modulator in a reflective mode is shown. Here, light from a laser diode 222 is collimated by a lens system 224 and passes through an output beamsplitter 226. The light beam is focused by a lens system 228 into the end 230 of a fiber spatial filter 232. After passage through the fiber spatial filter 232, the light beam exits the end 234 thereof, held in place by a ferrule 236 that contains both the spatial filter end 234 and the ends 238 and 240 of the fiber optic coil 242 which acts as the rotation sensing element of the gyro 220. The light beam is recollimated by a lens system 244 and is polarized by a polarizing beamsplitter cube 246 that also acts to steer the beam into an acousto-optic modulator 248. The acousto-optic modulator 248, in combination with a mirror 250 on the opposite side thereof, splits the light beam into zeroth and first order beams that are directed back through the polarizing beamsplitter cube 246 and the lens system 244 onto the opposite ends 238 and 240 of the fiber coil 242 potted into the ferrule 236. A predetermined one of the light beams, for example the zeroth order beam, circulates through the fiber coil 242, past an optical dither element 250, an intensity maintenance element 251 and out the opposite end 240. The light beam is then recollimated by the lens system 244 and directed back into the acousto-optic modulator 248 and mirror 250 combination by the polarizing beamsplitter cube 246. The zeroth order beam is then frequency shifted and directed back into the end 234 of the fiber spatial filter 232, is recollimated by the lens system 228 and is reflected off the beamsplitter 226 through a lens system 254 and mirror 256. The lens 254 and mirror 256 focus the beam through an aperture 258 into a light intensity detector 260. A similar situation exists for the first order deflected beam generated during the first pass through the acousto-optic modulator 248 which circulates in the opposite direction through the coil 242 and combines with the beam just described to form the combined output beam modulated intensity in accordance with the phase differences caused by passage through the coil 242 in rotation. Although not shown, a crossover is provided like crossover 188 so that one beam passes cw through the coil 242 while the other passes ccw.

Figure 14:
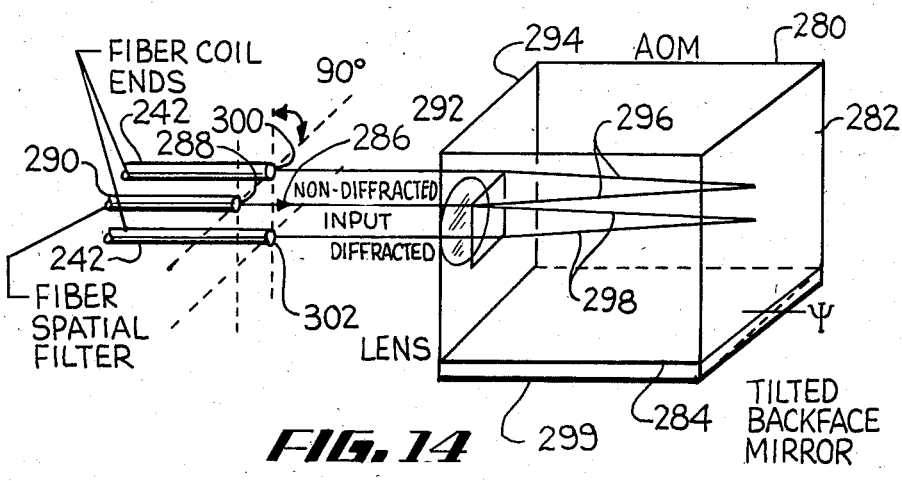
FIG. 14 is a perspective view of an acousto-optic modulator of a reflective configuration and FIG. 15 is a diagrammatic view of a still further compacted gyro constructed according to the present invention employing only two solid blocks of optical components.

FIG. 14 illustrates an acousto-optic modulator 280 used in the reflective mode configuration such as shown in gyro 220 where the mirror 282 has been incorporated into the modulator back surface 284. A light beam 286 is output at the end 288 of a spatial filter 290, is collimated by a lens system 292 which can be formed on the acousto-optic modulator's front surface 294, and is split into zeroth and first order beams 296 and 298, through the action of the acoustic field generated by the transducer element 299. These beams are directed into the opposite ends 300 and 302 of the fiber coil 242 by the mirror 282, which is slightly tilted through the angle $\psi$. The light beams 296 and 298 circulate through the coil 242, reenter the acousto-optic modulator 280, and are directed back into the fiber spatial filter 290 in a manner directly analogous to that described in association with FIG. 12. The mirror 282 acts to fold the system down, resulting in the possibility of a more compact design. It is not necessary that the three fiber ends 288, 300 and 302 be oriented as in FIG. 14. In particular, they may be all oriented in a line rather than in the right angle configuration shown. The right angle configuration does have the advantage of enhancing overall system performance as it effectively doubles the useful length of the acousto-optic modulator crystal.

Figure 15:
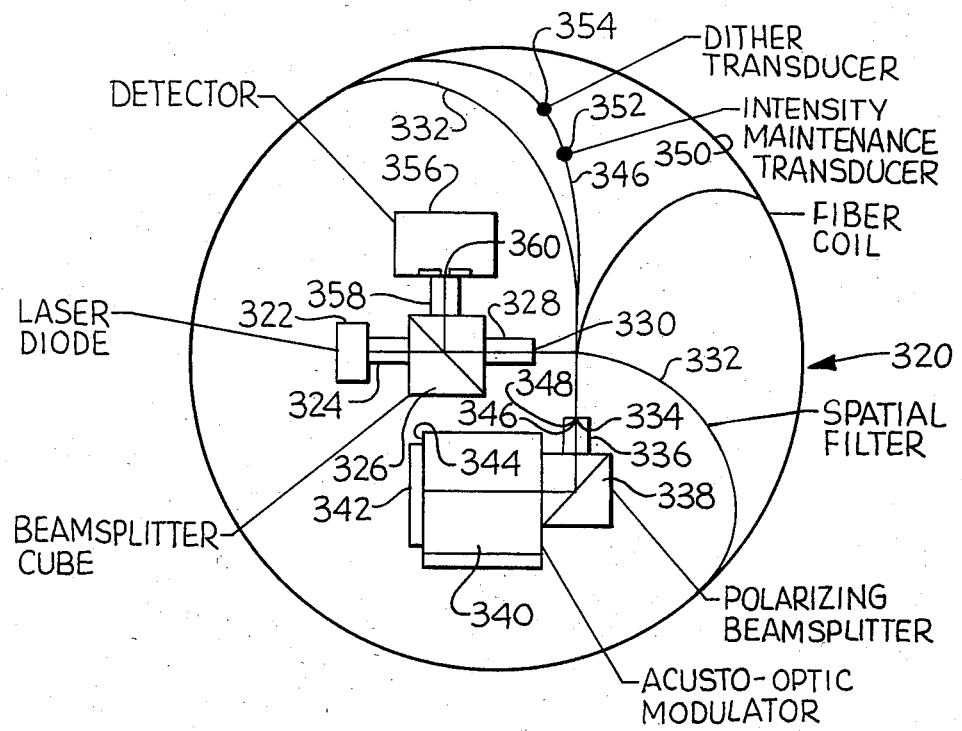

A gyro 320 constructed according to the present invention can be constructed without air gaps in a solid block configuration as shown in FIG. 15. This layout has a number of advantages including minimization of back reflections through the gyro 320 by elimination gaps between the components, eliminating contamination problems as the light path is completely contained and a decreased sensitivity to environmental effects, such as thermal gradients, shock and vibration, as well as the potential for a reduced overall size.

The gyro 320 includes a laser diode 322 that emits a beam of light that is collimated by a graded index lens 324. The lens 324 is bonded to a beamsplitter cube 326. This may be accomplished by techniques such as optical cementing or fusing after chemical preparation of the surfaces. The beam of light passes through the cube 326 and is focused by a second graded index lens 328 onto the end 330 of a fiber spatial filter 332. The light beam exits the opposite end 334 and is recollimated by a graded index lens 336 which sits on a polarizing beamsplitter cube 338. The polarizing beamsplitter cube 338 directs the beam into an acousto-optic modulator 340 having a mirror 342 on the back surface 344 thereof. The polarizing beamsplitter cube 338 defines the state of polarization of the gyro 320. The acousto-optic modulator 340 and the mirror 342 act in combination to split and frequency shift the beam. As has been described in association with FIGS. 10 and 13, the two resulting beams are directed into the opposite ends 346 and 348 of a fiber-optic coil 350 by the polarizing beamsplitter 338 and the lens 336. The two beams circulate in opposite directions through the fiber coil 350. An intensity maintenance transducer 352 assures that at least half the power of the light beam is maintained in the correct polarization state and an optical dither transducer 354 also is connected to the same coil end, such as end 346, (it could also be at the other end) to impress a sinusoidal phase sensitive signal upon the light beam. Upon emergence from the opposite ends 348 and 346 of the fiber coil 350, the two counterpropagating beams are recombined in the acousto-optic modulator 340 and directed back into the fiber spatial filter 332 by the polarizing beamsplitter cube 338 and lens 336. The mixed light beams propagate back through the spatial filter fiber 332 and are recollimated by the lens 328 and reflected toward a detector 356 by a graded index lens 358. The lens 358 acts to focus the light beam down through an aperture 360 into the detector 356. The gyro 320, as can be seen, has little in the way of components that can be disturbed by outside influences other than inertial forces as is desired, yet in operation it operates in a manner similar to the other gyros discussed.

The following describes in detail some of the elements that are used in the present optical gyro. FIG. 16 illustrates a bulk optical component phase modulator 370 that can be used as an optical dither element. A light beam 372 enters the polarizing beamsplitter cube 374 and passes through it in the p-polarization state. A quarter waveplate 376 converts the light beam 372 to the circular polarization state. The light beam then enters a variable etalon 378 formed by a partially transmissive mirror 380 mounted on a piezoelectric driver 282 and a stationary high-reflectance mirror 384. By driving the mirror 380 sinusoidally, an optical phase dither is established on the light beam 372. Since multiple passes are made within the etalon 378, large phase shifts can be achieved for small displacements of the mirror 380. The dithered light beam 386 leaves the etalon 378 and is converted by the waveplate 376 into the s-polarization state. The polarizing beamsplitter cube then reflects the dithered light beam 386 along the path 388. The system is reciprocal as a light beam 390 entering the system 370 in the s-polarization state leaves along the path 392 as dithered light beam 394.

A device 400 whose function and operation is similar to that described in association with FIG. 16 is shown in FIG. 17. However, instead of using mechanical motion to change the optical pathlength between the etalon mirrors, the device 400 employs an electro-optic modulator 402. The electro-optic modulator 402 is used to control the optical pathlength between a partially transmissive mirror 404 and a very high reflectance mirror 406 of an etalon 408 by an applied voltage. This configuration has the advantage of being amenable to a solid block format as all of the components the polarizing beamsplitter cube 374, the quarter wave plate 376, the two mirrors 404 and 406 and the electro-optic modulator 402 can be cemented together into a single unit.

A very simple optical phase dither element 420 is shown in FIG. 18A. Here the end 422 of an optical fiber 424 is moved toward and away from the incoming and outgoing light beams 426 and 428 by a piezoelectric element 430 connected thereto by a base element 432. This can be used to establish a relative optical path shift between counterpropagating light beams in the coil of the gyro.

Figure 18B:
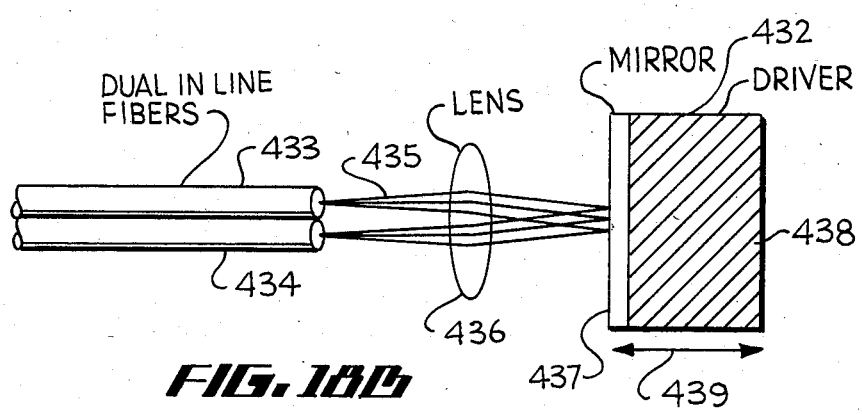
FIG. 18B is a diagrammatic view of an optical phase modulator based on dual in line fibers and a movable mirror.

FIG. 18B presents an optical phase dither element 432 based on dual in line fibers 433 and 434. Light 435 output from the top input fiber 433 is reimaged on the bottom fiber 434 and visa versa by a lens 436 and mirror 437. The motion of the mirror 437 caused by a driver 438 to which it is attached induces a variation in the optical path length that is used as a phase dither. The directions of the motion is generally parallel to the light 435 as indicated by the arrow 439.

FIGS. 19–23 teach a group of devices by which the effective optical pathlength within the fiber may be controlled and, consequently, are useful to provide optical dither. Each of these devices applies a force to a fiber to modify the index of refraction of the fiber. This force may be a bend, compression, rarefaction, twist, stretch, or the action of an electric or magnetic field. FIG. 19 presents a configuration 440 where the fiber 442 has been placed in a piezoelectric cylinder 446 attached to the fiber 442 by a fillet of epoxy 448. When a voltage is applied to the piezoelectric cylinder 446, a force is exerted on the fiber 442 that changes the index of refraction thereof. The degree of this effect depends on the magnitude of the voltage, and in this manner the phase of a light beam passing through the fiber 442 can be controlled. Elements similar in appearance and function can be constructed by depositing coatings directly on the fiber 442 that can be controlled by electromagnetic fields. Examples of this are when the cylinder 446 is a magnetostrictive jacket of nickel or piezoelectric coating of polyvinylidenefluoride (PVF) plastic.

One of the difficulties encountered with many fiber-optic phase modulators is nonuniform application of force, resulting in variable birefringence inducing an error signal. To avoid this problem, the device 460 of FIG. 20 employs a fluid-filled chamber 462 that exerts a uniform pressure on the fiber 464. The pressure applied by the fluid 466 is controlled by a piezoelectric element 468 which deforms the top 470 of the container 462 or deforms a part thereof.

Other elements that can be employed as phase shifters include a piezoelectric clamp device 480 shown in FIG. 21. The device 480 includes a clamp member 482 holding a pair of piezoelectric elements 484 and 486 against opposite sides of a fiber 488. Activation of the piezoelectric elements 484 and 486 exerts compression on the fiber 488. This induces birefringence in the fiber 488 and also can be used in association with the intensity maintenance scheme described earlier.

FIG. 22 shows a phase modulator element 500 that stretches the fiber 502 to produce modulation. It includes two clamps 504 and 506 bonded to the fiber 502 by an adhesive 508 such as epoxy and separated by a piezoelectric element 510. When a voltage is applied, the piezoelectric element pushes the clamps 504 and 506 apart stretching the fiber 502.

FIG. 23 illustrates a phase modulator 520 based on stretching that is built into the fiber end ferrule 522. This configuration has the advantage of being quite compact. The modulator 520 includes a piezoelectric element 524 held about the fiber 526 by a clamp 528 on the opposite side of the ferrule 522 to stretch the fiber 526. The clamps 504, 506 and 528 of FIGS. 22 and 23 simply may be beads of epoxy.

The acousto-optic modulator 170 that is described in association with FIGS. 11 and 12, splits the incoming light beam into two beams, one of which is frequency shifted. The frequency shift consists of a carrier frequency $F_c$ that allows operation of the modulator 170 in the Bragg regime, and a frequency F that is used to null out rotationally induced phase shifts in the optical gyro. For high accuracy systems, it is desirable to shift both counterpropagating beams by the carrier frequency prior to entering the fiber coil as this eliminates bias drift error due to dispersion. It is possible to achieve this condition using a single acousto-optic modulator element with multiple transducers. FIGS. 24–27 illustrate various embodiments.

In FIG. 24, a light beam 540 enters an end the 541 of the modulator element 542 at the Bragg angle $\alpha$ relative to transducer 544 and at frequency $F_c$. This beam 540 is split through the action of acoustic waves at frequency $F_c$, the carrier frequency of the acousto-optic modulator 546 generated by a first transducer 544 connected adjacent the end 541. A portion 548 of the light beam 540 is not frequency shifted, and it exits the opposite end 550 of the modulator element 542 in this condition. Another portion 552 of the light beam 540 is shifted in frequency by $-F_c$ and enters the sound field of a second transducer 554 at the Bragg angle $\alpha$. It is split into two beams 556 and 558. The light beam 556, does not undergo an additional frequency shift, while the light beam 558, which is upshifted in frequency by $F_c+F$ for a net change in frequency of F relative to the incoming light beam 540. The light beams 548 and 558 are used to establish counterpropagating beams in the coil of the gyro.

FIG. 25 illustrates a device 570 with similar performance but slightly different construction. The light beam 572 enters the front face 574 of the acousto-optic modulator element 576 at the Bragg angle $\alpha$ relative to transducers 578 and 580 mounted opposite sides 582 and 584 which are sloped at the Bragg angle. Within the sound field generated by the transducer 578, a portion of the beam 572 is split off and frequency shifted by $F_c$ as the beam 586 which exits the opposite end 587 of the modulator element 576. The remainder 588 of beam 572 continues to pass through the modulator element 576 and reaches the sound field generated by the transducer 580, where a portion of the beam 588 is split off and frequency shifted at $F_c+F$ as beam 590. Beams 586 and 590 exit the end 587 as shown and are coupled into the opposite ends of the fiber coil of the gyro, the difference in frequency between the two beams 586 and 590 being F.

Figure 26:
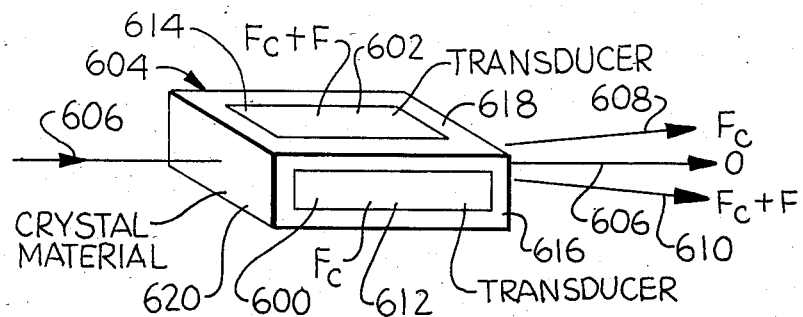
FIG. 26 is a diagrammatic view of a nonplaner frequency shifter/beamsplitter.

As shown in FIG. 26, it is not necessary to constrain the two transducers 600 and 602 of the modulator 604 to lie in the same plane. In the modulator 604, the input beam 606 is split into beams 608 and 610 by transducers 612 and 614 respectively which are mounted on 90° side surfaces 616 and 618 of the modulator element 620.

Figure 27:
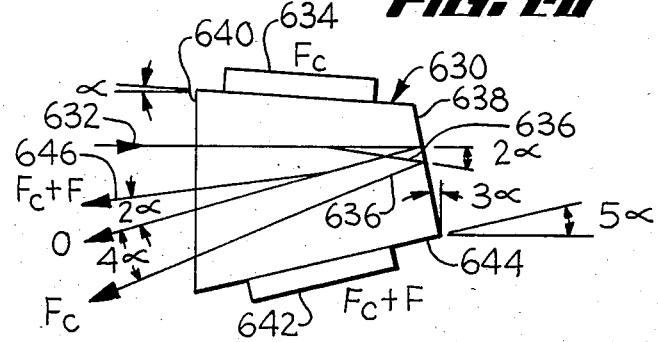
FIG. 27 is a diagrammatic view of a reflective mode frequency shifter/beamsplitter.

Acousto-optic modulators generating two spatially resolved light beams separated by frequency F can be laid out in a reflective mode analogous to that described in association with FIG. 14. FIG. 27 illustrates one gyro embodiment 630 of this type. The light beam 632 enters the modulator 630 at the Bragg angle $\alpha$ relative to the first transducer 634, one portion of the beam 632 is frequency shifted by $F_c$ and split off into beam 636. The beam 632 continues on and is reflected off the back surface 638 canted at $3\alpha$ to the front surface 640. The second transducer 642 is mounted on a surface 644 $5\alpha$ to the surface 640 so that the beam 632 reflecting off the back surface 638 is at the Bragg angle relative to the transducer 642. A portion of the beam 632 is frequency shifted by $F_c+F$ and deflected off as the beam 646. The beams 636 and 646 are used to establish counterpropagating beams in the fiber coil that differ in frequency by F.

The gyros 150, 220 and 320 shown in FIGS. 10, 13 and 15 may employ the acousto-optic modulator configurations 546, 570, 604, and 630 of FIGS. 24, 25, 26 and 27. These modulators allow a frequency difference F proportional to rotation rate to be established between the counterpropagating beams. In the absence of rotation F=0, and, consequently, bias drift due to relative dispersion between the counterpropagating beams goes to zero. Instead, this error term becomes a scale factor error whose constraints are much less severe than bias drift and which is correctable by monitoring the output wavelength of the light source.

Figure 28:
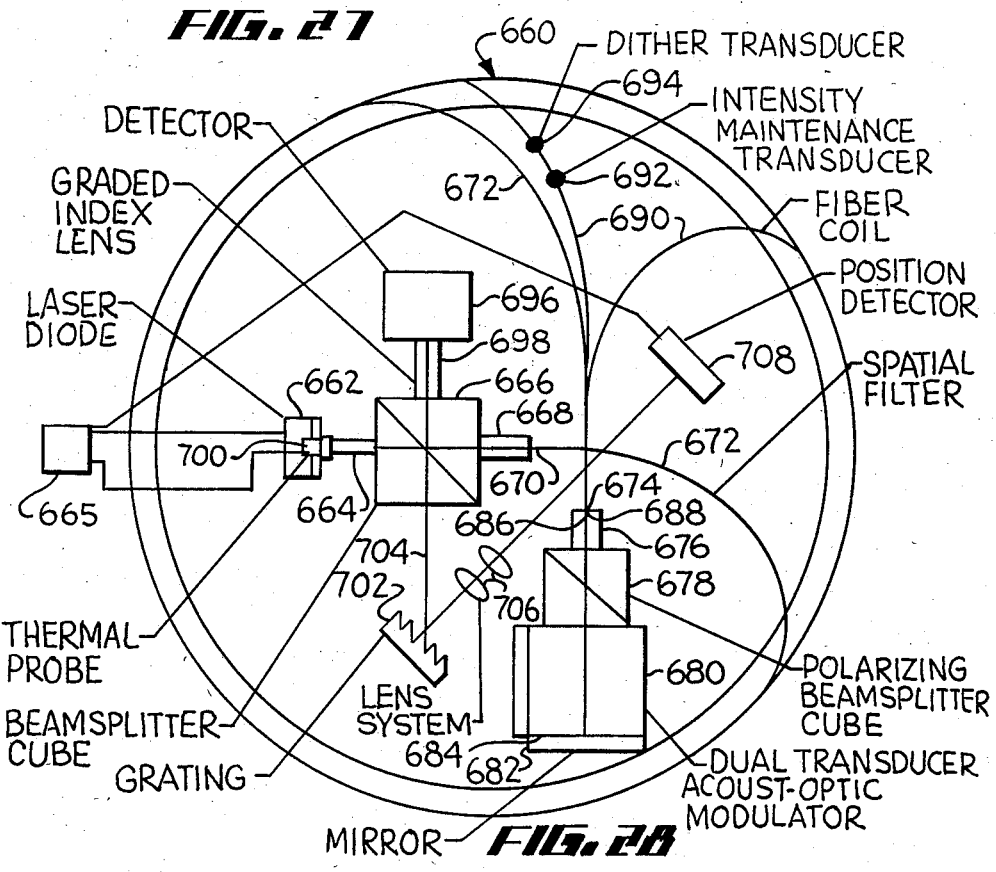
FIG. 28 is a diagrammatic view of an improved compact optical gyro.

There are a number of means to monitor the output wavelength of the light source. In the case of a laser diode or LED, the temperature of the device can be monitored, resulting in scale factor correction of about 100 PPM for 1° C. resolution. To achieve scale factor accuracy of 10 PPM or better, a miniature grating in combination with a position detector may be used. FIG. 28 illustrates a gyro embodiment 660 implementing these techniques. The gyro 660 is similar to gyro 320 shown in FIG. 15, it being of essentially a solid block construction without air gaps in the movement sensing portion. The gyro 660 includes a laser diode 662 that emits a beam of light. The laser diode 662 is controlled in light output by varying the voltage applied thereto by power supply, optical frequency regulator means 665. The power supply, optical frequency regulator means 665 also may be controllably varied for in flight cold starts or for other reasons described hereinafter. The beam of light out of the diode 662 is collimated by a graded index lens 664 which is bonded to a beamsplitter cube 666. The beam of light passes through the cube 666 and is focused by a second graded index lens 668 onto the end 670 of a fiber spatial filter 672. The light beam exits the opposite end 674 and is recollimated by a graded index lens 676 which is connected to a second polarizing beamsplitter cube 678. The polarizing beamsplitter cube 678 directs the beam into a dual transducer acousto-optic modulator 680 having a mirror 682 on the back surface 684 thereof. The polarizing beamsplitter cube 680 defines the state of polarization of the gyro 660. The acousto-optic modulator 680 and the mirror 682 act in combination to split and frequency shift the beam. As has been described in association with FIGS. 10 and 13 the two resulting beams are directed into the opposite ends 686 and 688 of a fiber optic coil 690 by the polarizing beamsplitter 678 and the lens 676. The two beams circulate in opposite directions through the fiber coil 690. An intensity maintenance transducer 692 assures that at least half the power of the light beam is maintained in the correct polarization state, and an optical dither transducer 694 is also connected to the coil 690 to impress a sinusoidal phase-sensitive signal upon the light beam. Although both transducers 692 and 694 are shown connected adjacent the same end of the fiber coil 690, this is not required and either could be connected adjacent either end thereof. Upon immergence from the opposite ends 688 and 686 of the fiber coil 690, the two counterpropagating beams are recombined into the acousto-optic modulator 680 and directed back into the fiber spatial filter 672 by the polarizing beamsplitter cube 678 and the lens 676. The mixed light beams propogate back through the spatial fiber filter 672 and are recollimated by the lens 668 and reflected toward a detector 696 by a graded index lens 698.

As shown, a thermal probe 700 is connected to the laser diode 662 to sense the temperature thereof. The electrical output of the thermal probe can be scaled to provide the aforementioned correction of about 100 ppm for 1° C. resolution. For even high resolution of 10 ppm or better, a miniature grating 702 is positioned to intercept a portion 704 of the beam from the laser diode 662 reflected by the beamsplitter cube 666. Differences in frequency cause the beam portion 704 to defract off of the grating 702 at an angle dependant upon its frequency. After defracting the beam portion 704, it is passed through a suitable lens system 706 and is focused on a position detector 708, the position of the beam portion 704 on the position detector 708 being a fine measure of the output wavelength of the laser diode 662. Alternatively, the present gyro has the capability to automatically track the laser source wavelength by utilizing dispersion within the fiber coil. This ability also allows the determination of rotation rate from an in-flight cold start.

FIGS. 10C and 10D illustrate the present gyro's ability to sample fringes that are widely space in frequency. FIG. 29 illustrate two fringe patterns 710 and 712 which show how this capability may be used to extract rotation rate without bias drift due to dispersion and to determine wavelength change to correct scale factor error. In the absence of rotation, the fringes 714 of the pattern 710 are positioned as shown with respect to arbitrary but predetermined frequency points 715, 716, and 717. Upon rotation, the fringes 714 shift with respect to the frequencies 715, 716 and 717, and the rotation rate has the form $$\Omega = \frac{(F_2 - F_1)n\lambda}{4R} \qquad (4)$$

where taking the difference in frequency $F_2 - F_1$ between the Mth and -Mth fringe allows the determination of the shift in frequency of the zeroth order fringe, eliminating bias drift due to dispersion. The change in wavelength of the light source can be extracted using $$d\lambda = \frac{\Delta F_1 + \Delta F_2}{F_1 + F_2}\left[\frac{1}{(\lambda_o/n_o)(dn/d\lambda)}\right] \qquad (5)$$

and used to correct scale factor. These techniques are of great importance to the successful application of high-accuracy fiber-optic gyros.

In order to determine the position of the zeroth other fringe from an in-flight cold start, note that the position in frequency of the Mth order fringe is given by $$F_M = \frac{2\Omega R}{\lambda n} \frac{Mc}{Ln} \qquad (6)$$

The first term corresponds to frequency change in the position of the fringe due to rotation and is independent of the order of the fringe. The second term depends on the order of the fringe and is wavelength dependent, as $$\Delta \frac{Mc}{Ln} = \frac{-Mc}{Ln}\left[\frac{\lambda}{n}\frac{dn}{d\lambda}\right]\frac{d\lambda}{\lambda} = \frac{-Mc}{Ln}\frac{d\lambda}{\lambda} \qquad (7)$$

where changes in the fiber coil length have been neglected. By oscillating or switching the input wavelength to the gyro, such as by modulating the power input to a laser diode, and sampling the motion of the fringe positions with changing wavelength, the Mth and -Mth order peak positions may be determined, from which the zeroth order peak position can be extracted.

In order to monitor wavelength as accurately as possible, fringes should be measured that are frequency spaced as widely as possible. One way to achieve this goal is to employ an acousto-optic modulator switch in a manner similar to the acousto-optic beamsplitters of FIGS. 24–27. FIG. 30A illustrates a simple acousto-optic modulator frequency switch 720. A light beam 722 enters the modulator 720 perpendicular to the end face 724. Dual transducers 726 and 728 are aligned at the Bragg angle toward the light beam 722 to upshift the light beam 722. Activating the transducer 726 at frequency $F_1$ produces a deflected beam at an upshifted frequency $F_1$. If the opposite transducer 728 is activated at $F_2$, it produces an upshifted light beam at $F_2$ deflected in the opposite direction as shown. FIG. 30B illustrates the action of a similar modulator 730 when the transducers 732 and 734 are oriented at the Bragg angle away from the input beam 736 so that the light beam 736 is down shifted. FIGS. 31A and 31B illustrate how the modulators 720 and 730 of FIGS. 30A and 30B may be combined to form a butterfly acousto-optic modulator switch 740. In particular, note that this switch 740 can be operated by activating transducers 728 and 734 with $F_1$ and $F_2$ respectively so that three distinct beams are generated at frequencies shifted relative to the input light beam of $-F_1$, 0, and $F_2$. The angular deviation of these light beams can be switched, as is shown in FIGS. 31A and 31B, by activating the opposite transducers 726 and 732 by $F_1$ and $F_2$. By coupling the light beams at the angle into opposite ends of a fiber optic coil in a manner similar to that shown in association with FIG. 12, counterpropagating beams can be established in the coil that differ by $F_1+F_2$. Switching to the opposite pair of transducers will cause the light beams to differ in frequency by $-F_1 -F_2$. Thus by measuring the fringe position in both cases, which differ in frequency by $2F_1+2F_2$, the output wavelength of the light source can be measured to high accuracy. The design of a compact phase-nulling optical gyro 750 employing the butterfly acousto-optic modulator switch 740 is shown in FIG. 32. It operates in a manner similar to the gyros 150, 220, 320, and 660 described in association with FIGS. 10, 13, 15 and 28.

In addition to the accurate determination of scale factor through wavelength monitoring usage of the switch technique eliminates bias drift as sampling is made about both sides of the zero frequency. A third important feature of this technique is that the output light signal is shifted in frequency from the incoming light signal. Since only the counterpropagating beams are shifted by this frequency the output signal is isolated from extraneous light falling onto the detector due to scattering off components in the system, Rayleigh backscatter in the fiber and similar effects.

The gyro 750 includes a light source 752 which transmits a beam of light through a graded index lens 754 to a beamsplitter 756 wherein a portion of the beam is deflected through a graded index lens 760 into a light source output monitor 758 which may be of the type described herein above. The remainder of the light from the source 752 passes through another graded index lens 762 and is coupled into the end 764 of a fiber spatial filter 766 which transmits it to another graded index lens 768 to a polarizer 770. The beam enters the butterfly acousto-optic modulator switch 740 from the polarizer 770 where it is operated on as described above to be placed in the opposite ends 772 and 774 of the fiber optic coil 776 by graded index lens 778. Optical phase dither and intensity maintaining elements 780 and 782 are placed on the fiber optic coil 776 to provide a dither and maintain the intensity of the counterpropogating beams within the coil 776. The counterpropogating beams then pass back through the switch 740, through the filter 766 and are deflected into the output detector 784 by the beamsplitter 756.

An alternative approach to the butterfly switch 740 is the dual in line acousto-optic modulator switch 790 shown in FIGS. 33A and 33B. Here the zeroth order beam 792 is used to generate one of the counterpropagating beams 794 and the frequency of the other light beam 796 is switched from F to $-F$ by turning on one or the other modulator 798 or 800. This switch 790 has the advantages of being simpler than the butterfly switch 740 and it requires less power as only one transducer 802 or 804 operates at any given time. The switch 790 can be substituted in place of the butterfly switch 740 in gyro 750 which thereafter operates in the same manner with the disadvantage that the frequency spacing between fringes available to track wavelength is decreased by a factor of two.

FIG. 34 illustrates a compact phase-nulling optical gyro 810 that uses a beamsplitting wedge 812 as the central beamsplitter. In particular the output from the light source 814 is collimated by a graded index lens 816 and passes into a beamsplitting cube 818. One portion of the light beam is split into a graded index lens 820 and is focused onto the light source monitor 822 which can be used in combination with a feedback loop (not shown) to stabilize the output of the light source 814. The output of the monitor 822 also can be used to appropriately adjust the gain on the signal of the output detector 824 as light source amplitude fluctuations occur. The other portion of the light beam is focused by a graded index lens 826 into the end 828 of the fiber spatial filter 830. The light beam exits the spatial filter 830 and is recollimated by a graded index lens 832, polarized by the element 834 and split into counterpropagating beams by the beamsplitting wedge 836. One of the light beams passes back through the polarizer 834 and is focused by the lens 832 into the fiber end 838. This light beam passes through an optical dither element 840 that impresses an AC phase modulation on the light beam for detection purposes. The light beam then continues on and passes an intensity maintenance element 842 used to avoid signal drop out due to changing birefringence in the fiber. This element 842 is not necessary if polarization preserving fiber is employed. The light beam exits the fiber end 844 and is collimated by a graded index lens 846. The collimated light beam enters an acousto-optic modulator 848 having a reflective back surface 850 to operate in the reflective mode. Operation in the reflective mode reduces the requirements on length and drive power for a given efficiency when compared to a straight pass system. The first order deflected beam is focused by the lens 846 into the end 852 of a fiber optic coil 854. The light beam exits the opposite end 856 of the fiber optic coil 854 and is collimated by a graded index lens 858. The collimated beam enters a second acousto-optic modulator 860 having a reflective back surface 862 to operate in the reflective mode and the first order deflected beam is focused by the lens 858 into the fiber end 864. The light beam exits the opposite fiber end 866 and is recollimated by the lens 832. The light beam enters the polarizer 834 and is reflected off the beamsplitter wedge 836. A portion of the light beam passes back out the polarizer 834 and is focused by the lens 832 onto the end 868 of the fiber spatial filter 830. The light beam exits the fiber spatial filter 830 and is recollimated by the lens 826 and reflected off the beamsplitter 818 onto the output detector 824 via a graded index lens 870 and an aperture 872. A similar light beam propagates in the opposite direction through the system and the two light beams mix to form the output of the gyro 810.

FIG. 35 illustrates a compact gyro 880 that uses acousto-optic modulators 882 and 884 in a straight pass mode. Here light from the source 886 is collimated and focused into the end of a fiber spatial filter 888. After passage through the filter it is recollimated and polarized in a polarizer 890 before being split into counterpropagating beams by a central beamsplitter 892. One split light beam passes straight through the beamsplitter 892 and enters the acousto-optic modulator 882. The first order diffracted beam from this modulator 882 is focused into one end 894 of the fiber coil 896. If conventional single mode fiber is used, an intensity maintenance element 898 is used but with polarization preserving fiber, it is not necessary. An optical dither is established by stretching the fiber at one end 900 of the coil 896 with an optical dither element 902 similar to element 520 or by employing any one of the other phase modulators such as 420, 440, 460, 480, or 500 described earlier. The light exits the opposite end 900 of the fiber coil 896, is recollimated and enters the second acousto-optic modulator 884. The first order diffracted beam is then reflected off the beamsplitter 892, polarized and focused into the fiber spatial filter 888. After exiting the fiber spatial filter 888 the light beam is recollimated and reflected off the beamsplitter 904 onto the output detector 906 via a lens 908 and aperture 910. The other split light beam passes through the coil 898 in the opposite direction to be recombined at the beamsplitter 892 for eventual detection as a mixed beam on the detector 906.

Figure 36:
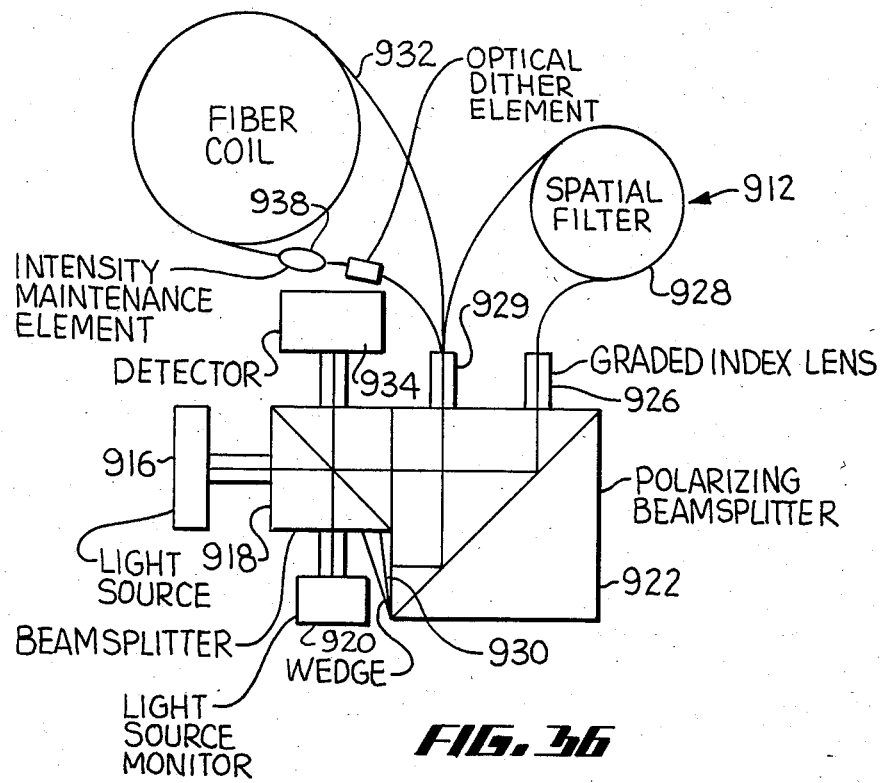
FIG. 36 is a diagrammatic view of a third alternate embodiment of the improved compact optical gyro.
Figure 37:
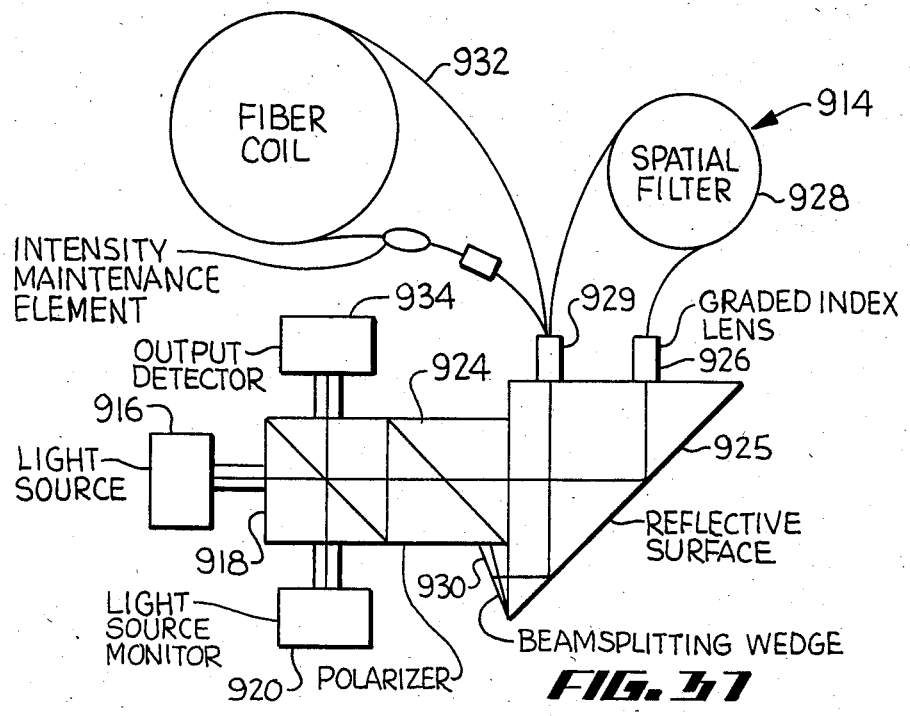
FIG. 37 is a diagrammatic view of a modified third alternate embodiment of the improved compact optical gyro.

FIGS. 36 and 37 illustrate simple analogue gyros 912 and 914 that employ a single block and have no acousto-optic modulators. In both, light from a source 916 is collimated and passed through a beamsplitter 918. A portion of this light beam is split off and may be fed to a monitor 920 of the light source output. The other portion of the light beam is polarized after reflection by a polarizing beamsplitter 922 as in FIG. 36 or by a straight pass through a polarizer 924 and a prism 925 as in FIG. 37. The light beam is then reflected onto a graded index lens 926 and focused into a fiber spatial filter 928. The light beam exits the spatial filter 928, is recollimated by lens 929 and split into counterpropagating beams by a beamsplitting wedge 930. The two beams then propagate in opposite directions through the fiber coil 932, are recombined and directed back into the fiber spatial filter 928 and fall onto the detector 934 in a manner similar to that described in association with the previous Figures. Since there is no basic frequency difference between the two beams, the decoding of the information impressed on the two beams during their passage through the coil 932 must rely on the difference created in the beams by an optical dither element 936 and the beam maintenance of an intensity maintenance element 938 (unless polarization preserving fiber is used). Of course, the dynamic range of the devices 912 and 914 is greatly reduced since they must use analogue detection. If acousto-optic modulators placed in the light path of gyro 912, like is shown in with gyro 940, or a reflective acousto-optic modulator is substituted for the wedge 930 in gyro 914, they can be operated as the other digital devices described herein.

Figure 38:
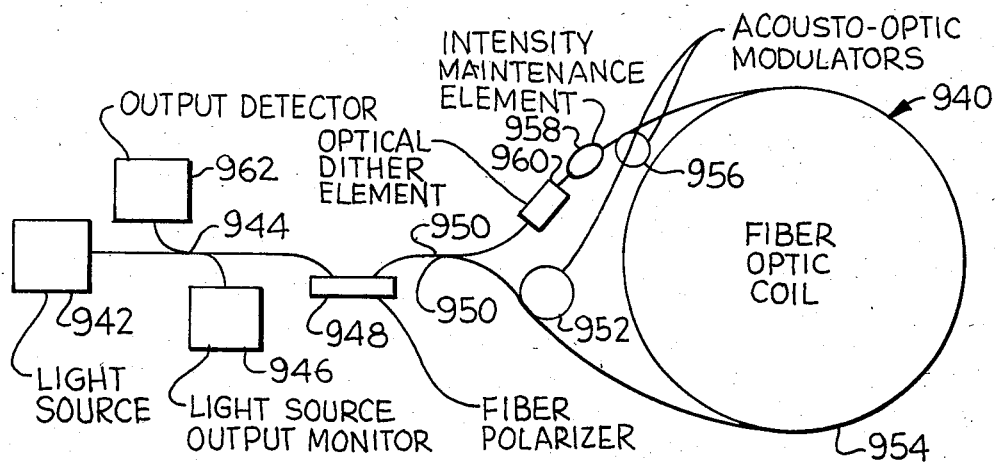
FIG. 38 is a diagrammatic view of an all fiber phase-nulling optical gyro.

FIG. 38 is a schematic diagram of an all fiber phase-nulling optical gyro 940. A light source 942 is pigtailed to a fiber beamsplitter 944. The input light beam to the beamsplitter 944 is split into two parts. One part is directed into a light source output monitor 946 that may be used to correct amplitude fluctuations of the light source 942. The other part of the light beam is polarized by passage through a fiber polarizer 948 and split into counterpropagating beams by a central beamsplitter 950. The light beam that propagates in the counterclockwise direction is frequency shifted by a fiber frequency shifter 952 and enters a fiber optic coil 954. After leaving the fiber coil 954, it is frequency shifted by a second fiber frequency shifter 956. The light beam then enters an intensity maintenance element 958 that prevents signal drop out and would be unnecessary if polarization preserving fiber were employed. Before returning to the central beamsplitter 950, a phase modulation is impressed on light beam by an optical phase dither element 960 for detection purposes. The light beam is then directed by way of the beamsplitter 950 back through the fiber polarizer 948 and the input/output beamsplitter 944 onto an output detector 962. The other beam out of the beamsplitter 950 travels about the coil 954 in the clockwise direction to be operated on by the various elements before recombination at the beamsplitter 950. The gyro 940 therefore operates like the gyros described above.

Figure 39:
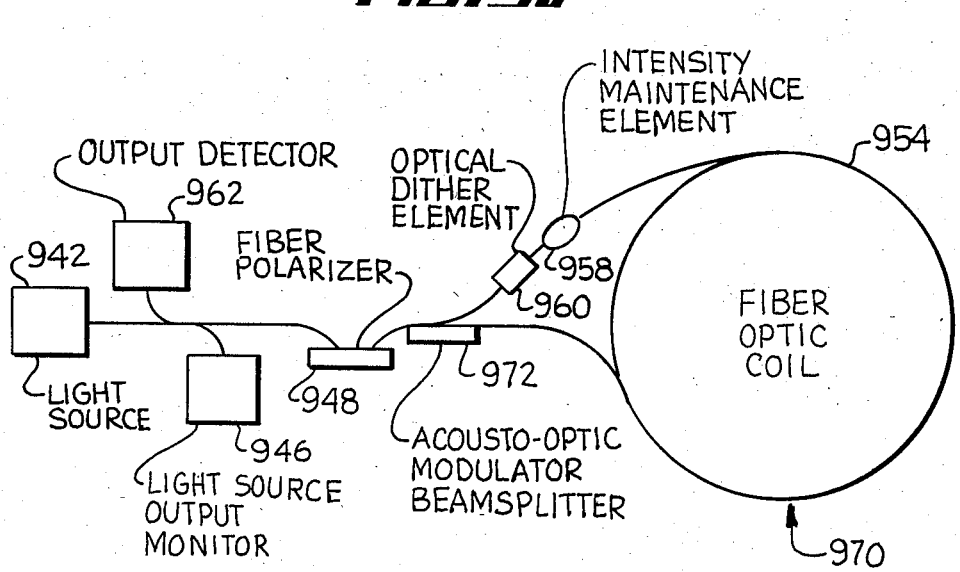
FIG. 39 is a diagrammatic view of an alternate embodiment of an all fiber phase-nulling optical gyro.

A modified configuration 970 of the all fiber phase-nulling optical gyro 940 is shown in FIG. 39. Here the fiber optic beamsplitter 950 and fiber optic frequency shifters 952 and 956 have been replaced by a frequency shifter/beamsplitter 972 such as that shown in FIG. 41. The operation of this gyro 970 is similar to that described herein above of bulk optic phase-nulling optical gyros 660 or 750 using an acousto-optic modulator/beamsplitter 680 or 740.

Figure 40A:
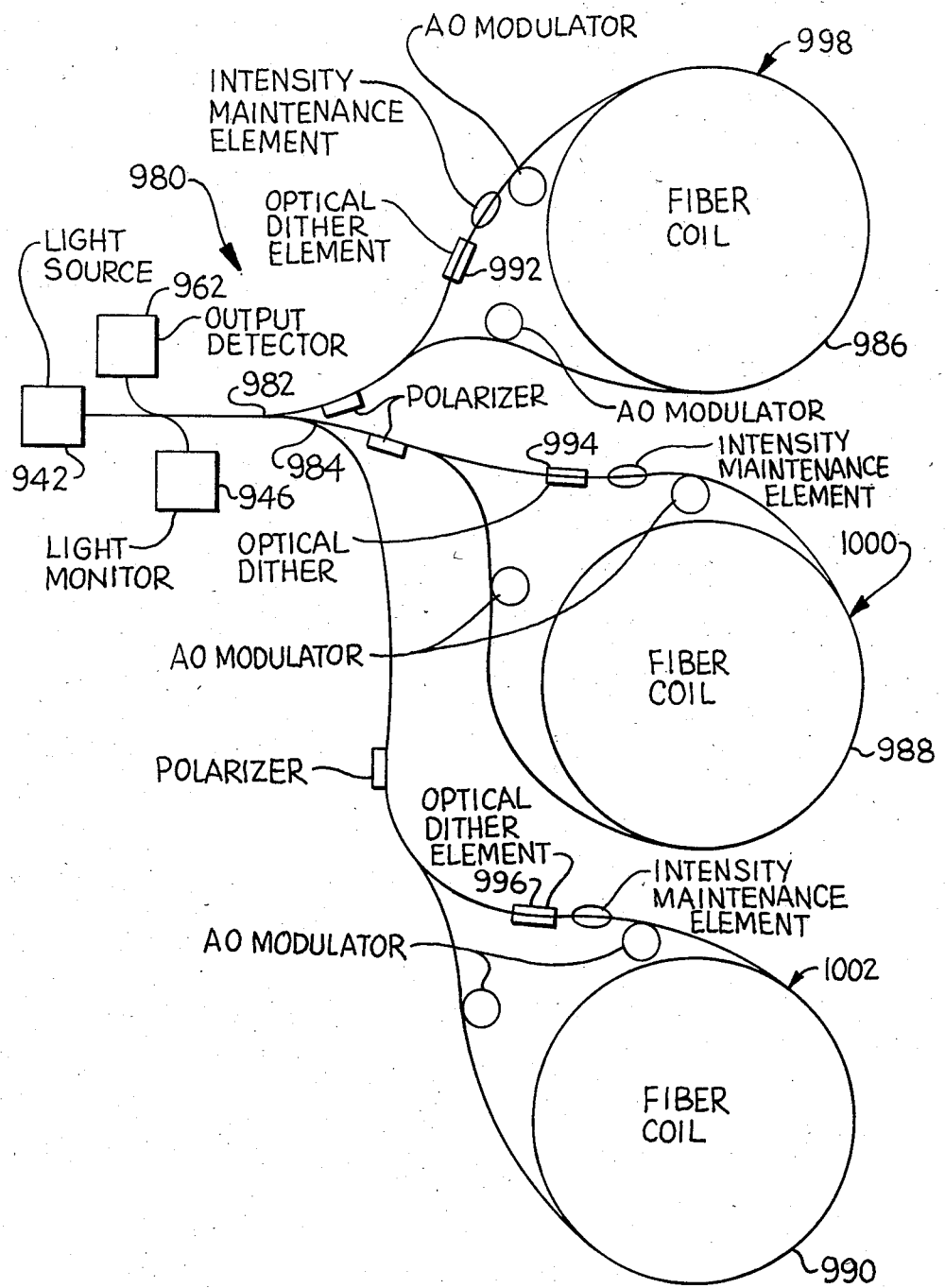
FIG. 40A is a diagrammatic view of a multiplexed all fiber phase-nulling optical gyro triad.
Figure 40B:
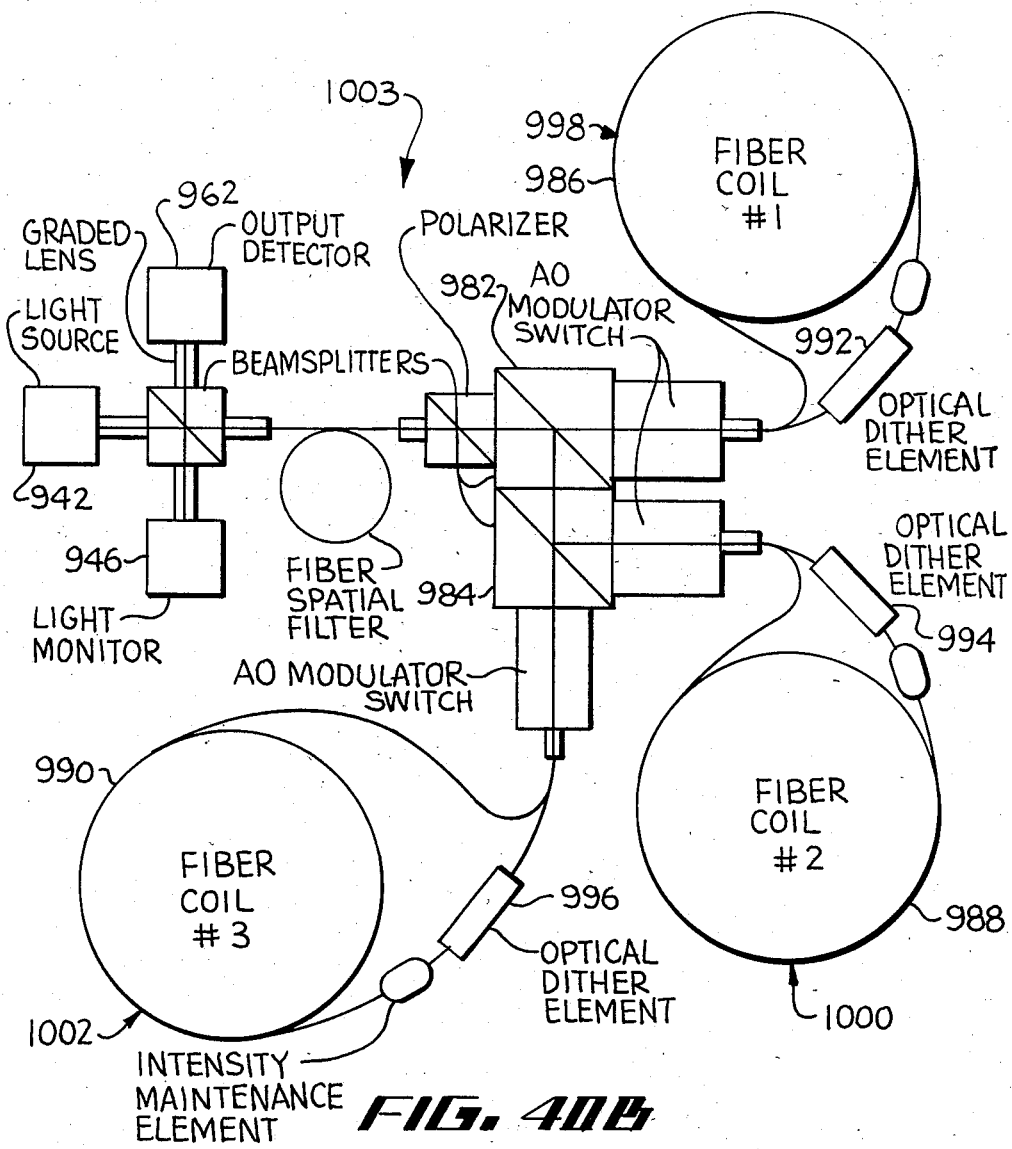
FIG. 40B is a diagrammatic view of a multiplexed phase-nulling optical gyro triad based on bulk optics.

FIG. 40A shows how the all fiber phase-nulling optical gyros 940 or 970 may be multiplexed into a triad 980. This involves using fiber beamsplitters 982 and 984 to separate three rotationally sensitive coils 986, 988 and 990 and optical dither elements 992, 994 and 996 operating at three distinct frequencies so that the output signals from each of the individual sensors 998, 1000 and 1002 may be demultiplexed. If the coils 986, 988 and 990 are orientated at right angles, a three axis gyro is produced which requires only one light source 942, one light source monitor 946 and one output detector 962. It is also possible to multiplex the optical gyro into a triad 1003 using discrete bulk optic components as is shown in FIG. 40B. The similar components of FIG. 40B have been given the same numbers as in FIG. 40A.

Figure 41:
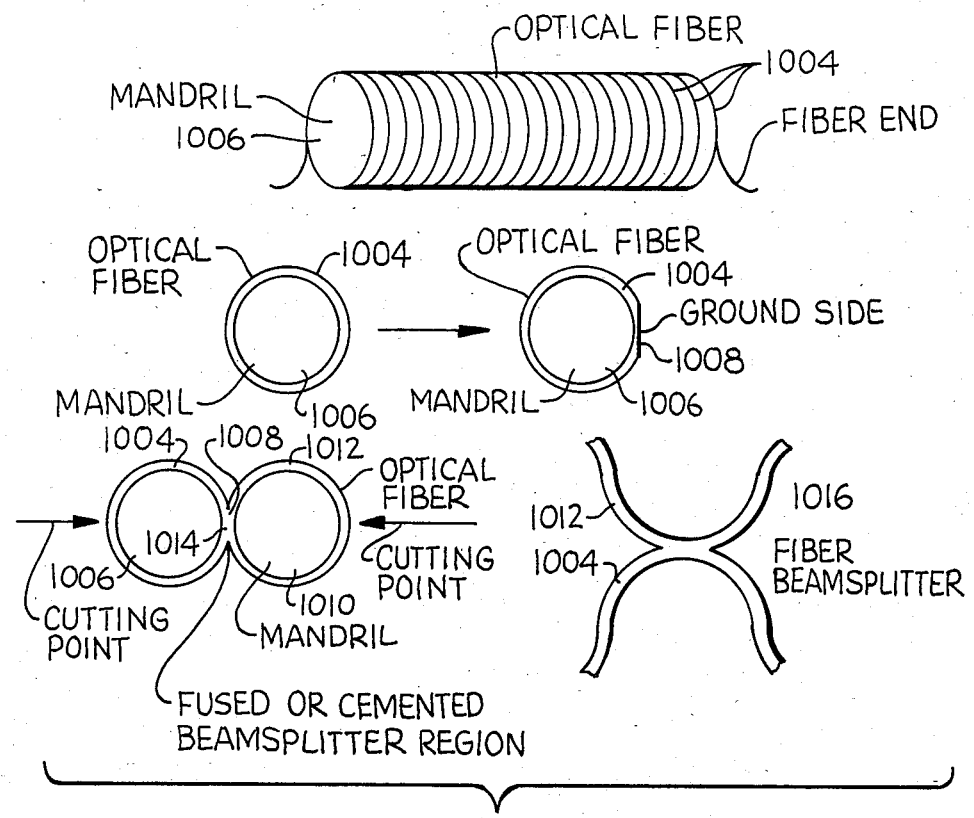
FIG. 41 illustrates means to mass produce fiber beamsplitters.

FIG. 41 illustrates a method for mass producing fiber optic beamsplitters such as beamsplitters 982 and 984 of FIG. 40. The fiber 1004 is wound about a mandrel 1006. Then one side 1008 of the fiber 1004 is ground down so that the cladding thereon has been removed to the desired depth. Another mandrel 1010, prepared with a wound fiber 1012 and a flat side 1014 in the same manner is aligned so that the ground areas are in contact. They are joined by fuzing or cementing techniques. The fibers 1004 and 1012 on the mandrels 1006 and 1010 are then cut to form multiple beamsplitters 1016.

Figure 42:
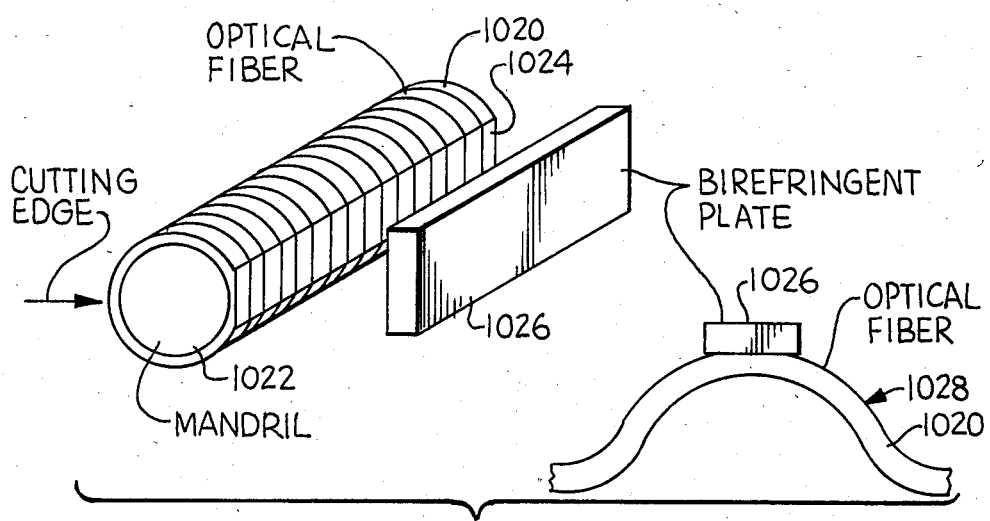
FIG. 42 illustrates means to mass produce in-line fiber polarizers.

FIG. 42 shows a method for mass producing in line fiber polarizers such as polarizer 948 in FIGS. 38 and 39. The fiber 1020 is wrapped around a mandrel 1022 and one side 1024 of the coil of fiber 1020 is ground down as was the case for the fiber beamsplitters 1016. However, in this case a birefringent plate 1026 is positioned on the side 1024 aligned such that only one linear polarization propagates through the fiber 1020. The fiber 1020 and plate 1026 are cut to form the polarizer 1028. The other polarization state is lost via leakage of light into the plate 1026.

Figure 43A:
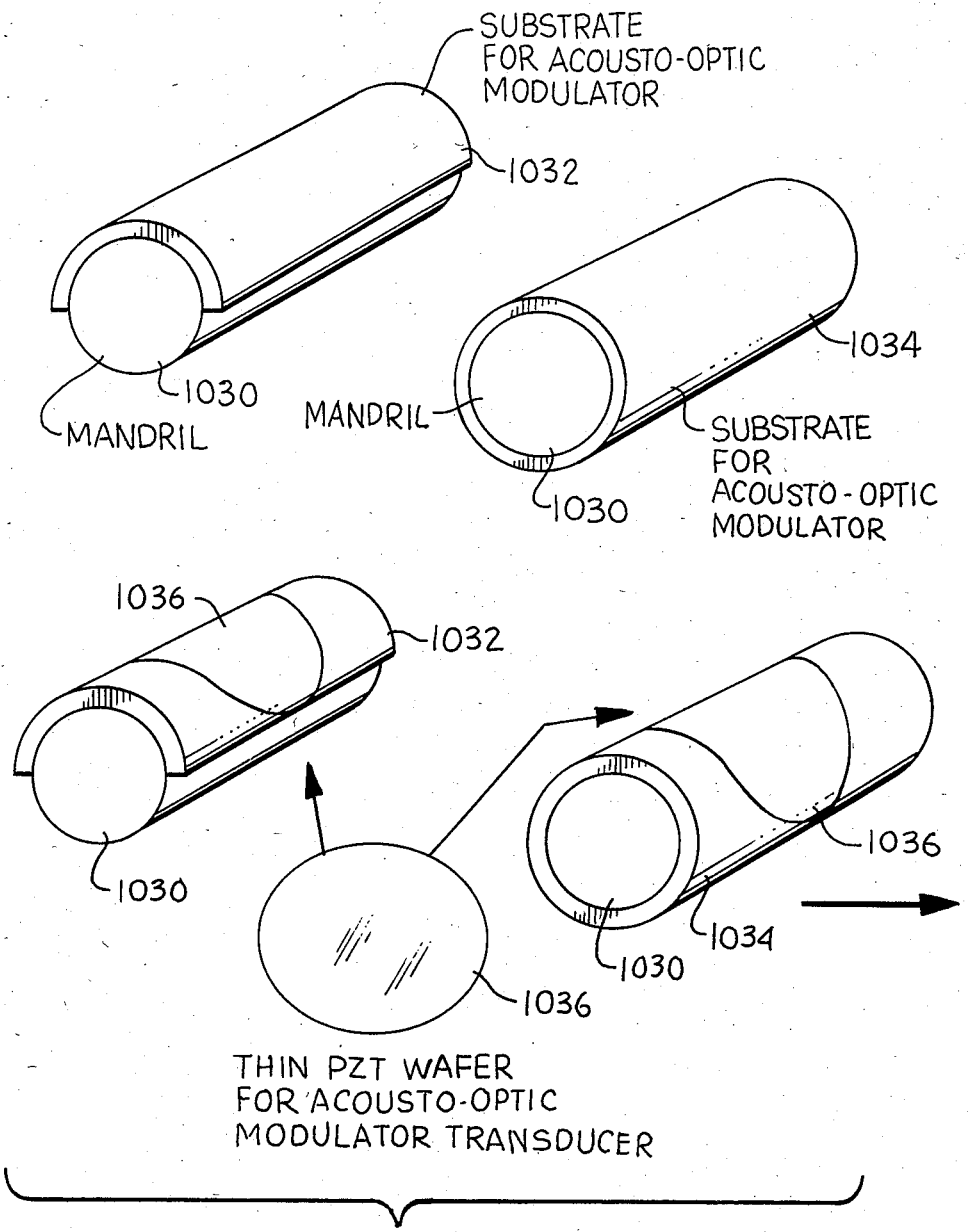
FIGS. 43A and 43B illustrate means to mass produce in line fiber frequency shifters.
Figure 43B:
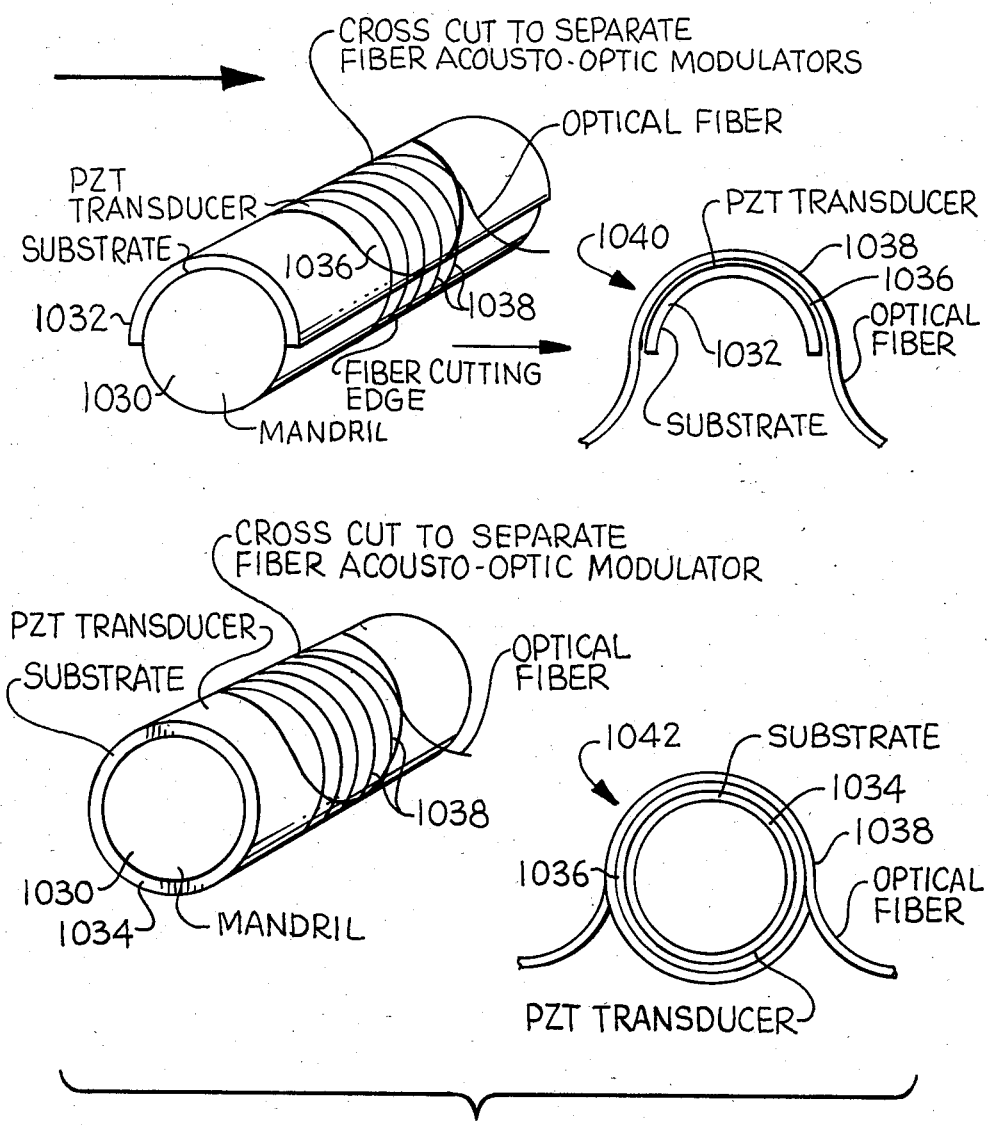

FIGS. 43A and 43B illustrate a method for mass producing in line fiber frequency shifters such as shifters 952 and 956. A mandril 1030 is used to support a substrate 1032 or the mandril 1030 itself may include substrate 1034. A thin piezoelectric wafer 1036 that acts as the transducer for the fiber frequency shifter is bonded onto the substrate 1032 or 1034. An optical fiber 1038 is then wound about the substrate 1032 or 1034 and bonded in place. The substrate 1032 or 1034 is then cut into slices to form individual frequency shifters 1040 or 1042.

Figure 44:
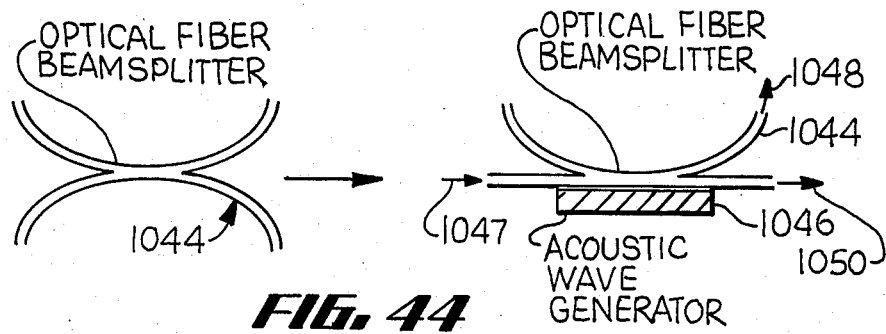
FIG. 44 illustrates an alternate means to produce in line fiber frequency shifters.
Figure 41:
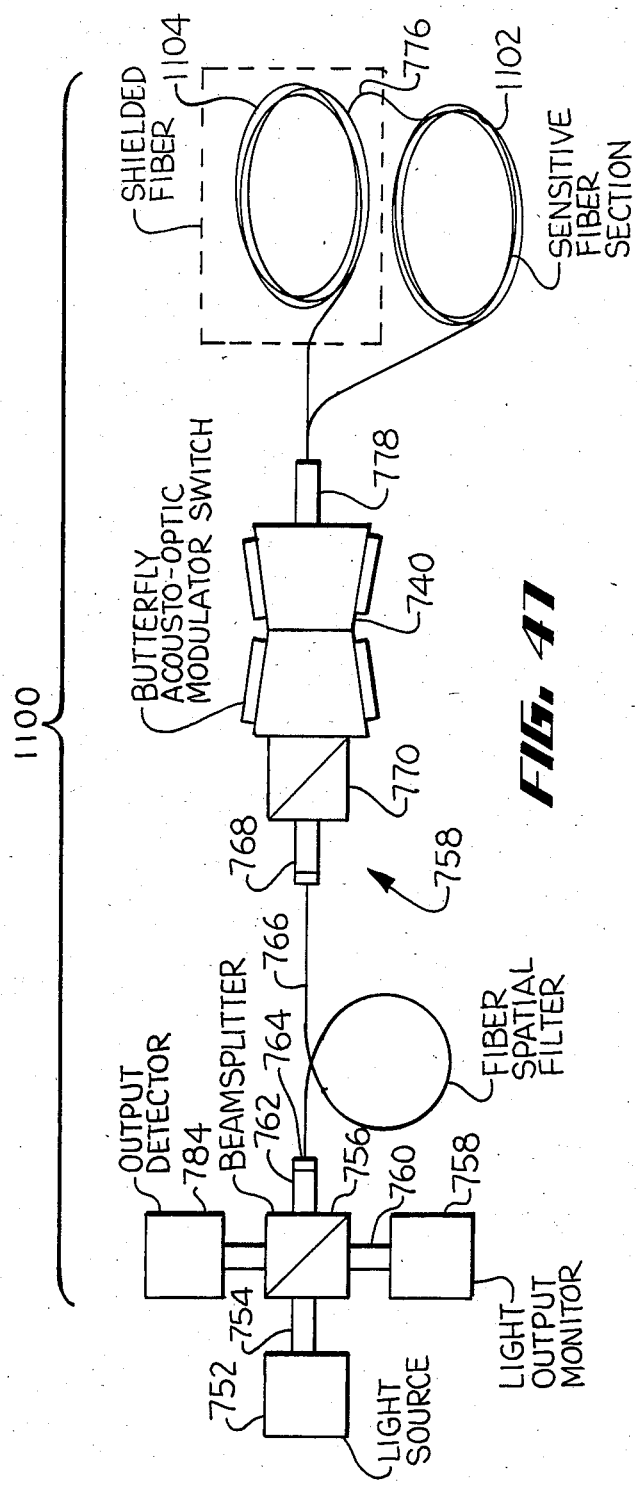

An alternative method is shown in FIG. 44. Here a fiber optic beamsplitter 1044 is bonded directly to an acoustic wave generator 1046. The input light beam 1047 then is split into separate channels as the zeroth and first order diffracted beams 1048 and 1050.

The phase-nulling techniques and layouts described above can be modified slightly to form a number of useful devices and sensors. FIG. 45 illustrates a phase-nulling fiber optic diagnostic system 1060 that can be used to measure the length of fiber 1062 on a spool 1064 in the manner described in association with FIGS. 10C and 10D. Any of the basic phase-nulling optical gyro designs described could be used here, even though gyro 880 is shown, the basic change being that fiber alignment fixtures 1066 and 1068 are provided to attach the length of fiber 1062 to be tested. These fixtures 1066 and 1068 may consist of v-grooves used to align the fiber ends 1074 and 1076 in micropositioning units. Its length can be determined from the output on the detector 906.

FIG. 46 illustrates a phase-nulling optical spectrometer 1090 that can be used to determine the output wavelength from an unknown source in a manner similar to that described in association with FIGS. 10C, 10D, 29, and 32. The main difference is that the light source 752 has been replaced by a light source 1092 of unknown frequency. Although other phase-nulling optical gyro layouts could be used, gyro 750 is shown. The wavelength of the output of the light source 1092 can be determined from the number of fringes falling on the detector per frequency change as discussed above in association with FIGS. 10C and 10D. Since frequency can be measured quite accurately an extremely sensitive spectrometer may be formed in this manner. When the coil 776 is held stationary, or is wound in a figure 8 configuration to null the effect of any rotation, the fringes are more easily measured.

FIG. 47 shows a general phase-nulling configuration 1100 that can be used as a magnetometer, electometer, acoustic sensor, accelerometer, pressure or temperature sensor. Essentially any environmental effect that can be made to induce a nonreciprocal phase shift in an optical fiber can be detected by a phase-nulling optical fiber sensor. As an example, by coating the sensitive fiber section 1102 with nickel or any other magnetostrictive material, the coating will constrict in the presence of a magnetic field inducing an index of refraction change in the sensitive portion of the fiber coil 1102. If one-half of the length of the fiber coil 776 is coated while the other half 1104 is shielded from the effect, the maximum sensitivity is produced. As shown, the coil portion 1102 is wound in the opposite direction to coil portion 1104 so that rotation of the coil 776 does not affect the output thereof. The time varying portion of this index of refraction change induces a nonreciprocal phase shift between counterpropagating beams in the fiber coil 776 which is sensed by the phase-nulling technique and used to measure the variation in the magnetic field. An electrometer can be made which senses electric fields by using piezoelectric coating materials. Detection of acoustic waves (pressure variations), and temperature changes can be accomplished in a similar manner by coating the fiber with materials that constrict or deform rapidly under pressure or temperature variations or by applying the variations directly to the fiber. In particular by potting the sensitive portion of the coil 1102 with pressure sensitive material and integrating the output of the sensor 1100, an accelerometer can be formed.

Thus there has been shown and described novel, compact, passive fiber-optic gyros and related devices which fulfill all the objects and advantages sought therefore. Many changes, modifications, variations and other uses and applications of the subject invention will, however, become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

What is claimed is:

1. An optical device which uses counterpropagating beams of light capable of sensing at least one environmental effect including:
   a source which produces a first beam of light;
   means for splitting said first beam of light into at least second and third beams of light;
   a light path, said light path being capable of having the environmental effect applied thereto;
   means for directing said second and third beams of light in opposite directions along said light path to establish a counterpropagating light path for said second and third beams;
   means capable of shifting the frequency between said second and third beams of light, said means being positioned in said second and third beams of light so that one of the beams is frequency shifted prior to passing through said counterpropagating light path and the other is frequency shifted after passing through said counterpropagating light path;
   means capable of varying nonreciprocal phase shift between said second and third beams of light positioned in said second and third beams of light so that one of the beams is varied prior to passing through said counterpropagating light path and the other is varied after passing through said counterpropagating light path;
   means for recombining said second and third beams of light into a fourth beam of light after said second and third beams of light have been directed along said counterpropagating light path;
   means for detecting said fourth beam of light and producing therefrom an output indicative of phase shift induced by the environmental effect;
   means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect; and means to control the frequency output of said light source by varying the voltage applied thereto, which control means include:

an acousto-optic modulator switch positioned in said first beam of light capable of switching the frequency thereof; and means associated with said detector means to compare the fringes on said detector as said frequency of the light source output is switched to determine which fringes bound the zeroth order peak.

2. The optical device defined in claim 1 wherein said acousto-optic modulator switch includes:

a first surface aligned at a right angle to said first beam of light;

a second surface out of parallel alignment with said first beam of light by the Bragg angle;

a third surface out of parallel alignment with said first beam of light by the Bragg angle and out of parallel alignment with said second surface by twice the Bragg angle;

a fourth surface;

a first transducer being driven at a first acoustic frequency mounted on said third surface; and a second transducer being driven at a second acoustic frequency mounted on said second surface so that said first beam emanates out of said fourth surface, a first frequency shifted beam of the frequency of the first beam differenced by said first acoustic frequency emanates out of said fourth surface, and a second shifted beam of the frequency of the first beam differenced by said second acoustic frequency emanates out of said fourth surface.

3. The optical device defined in claim 1 wherein said acousto-optic modulator switch second and third sides cant away from each other as they extend from said first side to said fourth side.

4. The optical device defined in claim 1 wherein said acousto-optic modulator switch includes:

a first surface aligned at a right angle to said first beam of light;

a second surface out of parallel alignment with said first beam of light by the Bragg angle;

a third surface out of parallel alignment with said first beam of light by the Bragg angle and out of parallel alignment with said second surface;

a fourth surface out of parallel alignment with said first beam of light by the Bragg angle;

a fifth surface out of parallel alignment with said first beam of light by the Bragg angle and out of parallel alignment with said fourth surface;

a sixth surface;

a first transducer mounted on said second surface;

a second transducer mounted on said third surface;

a third transducer mounted on said fourth surface; and a fourth transducer mounted on said fifth surface, said first, second, third, and fourth transducers being driven so that said first beam emanates out of said sixth surface, a first frequency shifted beam of the frequency of the first beam differenced by a predetermined first acoustic frequency emanates out of said sixth surface, and a second shifted beam of the frequency of the first beam differenced by a predetermined second acoustic frequency emanates out of said sixth surface.

5. The optical device defined in claim 4 wherein said first and sixth surfaces are parallel to each other and perpendicular to said first beam of light.

6. The optical device defined in claim 5 wherein said first and third transducers, and said second and fourth transducers are alternately driven with said predetermined first acoustic frequency and said predetermined second acoustic frequency so that said first and second shifted beams emanate out of said sixth surface alternately at the Bragg angle on opposite sides of said first beam.

7. The optical device defined in claim 6 wherein said means for directing said second and third beams of light in opposite directions along a path to establish a counterpropagating light path for said second and third beams include:

a length of optical fiber having first and second ends, said ends being aligned with said acousto-optic modulator switch so that said first and second shifted beams pass into said first and second ends thereof.

8. An optical device which uses counterpropagating beams of light capable of sensing at least one environmental effect including:, a light source which produces a first beam of light;

means for splitting said first beam of light into at least second and third beams of light;

a light path, said light path being capable of having the environmental effect applied thereto;

means for directing said second and third beams of light in opposite directions along said light path to establish a counterpropagating light path for said second and third beams;

means capable of shifting the frequency between said second and third beams of light, said means being positioned in said second and third beams of light so that one of the beams is frequency shifted prior to passing through said counterpropagating light path and the other is frequency shifted after passing through said counterpropagating light path;

means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by the environmental effect;

means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect, wherein said means for directing said second and third beams of light in opposite directions along a path to establish a counterpropagating light path for said second and third beams and said means capable of shifting the frequency between said second and third beams of light include:

an acousto-optic modulator having a front surface and a reflective back surface, said front surface being positioned to intercept said first beam of light, said acousto-optic modulator when driven generating diffracted and non-diffracted beams of different frequency which are said second and third beams of light, said back surface being tilted with respect to said front surface to reflect said second and third beams of light out of said front surface at locations different from said first beam of light into said opposite directions along the path.

9. The optical device defined in claim 8 further including:

a optical fiber spatial filter positioned between said light source and said acousto-optic modulator front surface through which said first beam of light passes.

10. The optical device defined in claim 8 wherein said light path is a length of optical fiber having first and second ends, said first end thereof being optically aligned with said diffracted beams and said second end thereof being optically aligned with said non-diffracted beam of different frequency as they leave said front surface.

11. An optical device which uses counterpropagating beams of light capable of sensing at least one environmental effect including:

a light source which produces a first beam of light;
means for splitting said first beam of light into at least second and third beams of light;
a light path, said light path being capable of having the environmental effect applied thereto;
means for directing said second and third beams of light in opposite directions along said light path to establish a counterpropagating light path for said second and third beams;
means capable of shifting the frequency between said second and third beams of light, said means being positioned in said second and third beams of light so that one of the beams is frequency shifted prior to passing through said counterpropagating light path and the other is frequency shifted after passing through said counterpropagating light path;
means capable of varying nonreciprocal phase shift between said second and third beams of light positioned in said second and third beams of light so that one of the beams is varied prior to passing through said counterpropagating light path and the other is varied after passing through said counterpropagating light path;
means for recombining said second and third beams of light into a fourth beam of light after said second and third beams of light have been directed along said counterpropagating light path;
means for detecting said fourth beam of light and producing therefrom an output indicative of phase shift induced by the environmental effect;
means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect, wherein said means for directing said second and third beams of light in opposite directions along a path to establish a counterpropagating light path for said second and third beams and said means capable of shifting the frequency between said second and third beams of light include:

an acousto-optic modulator having;
a first surface mis-aligned from a right angle to said first beam of light by the Bragg angle;
a second surface aligned at a right angle to said first surface;
a third surface aligned parallel to said second surface;
a fourth surface parallel to said first surface;
a first transducer mounted on said second surface; and
a second transducer mounted on said third surface, said first and second transducers being alternately driven at a predetermined frequency so that said first beam emanates out of said fourth surface undiffracted as said second beam of light and a diffracted beam at a frequency alternately above and below said second beam of light by said predetermined frequency emanates out of said fourth surface as said third beam of light.

12. An optical device which uses counterpropagating beams of light capable of sensing at least one environmental effect including:

a light source which produces a first beam of light;
means for splitting said first beam of light into at least second and third beams of light;
a light path, said light path being capable of having the environmental effect applied thereto;
means for directing said second and third beams of light in opposite directions along said light path to establish a counterpropagating light path for said second and third beams;
means capable of shifting the frequency between said second and third beams of light, said means being positioned in said second and third beams of light so that one of the beams is frequency shifted prior to passing through said counterpropagating light path and the other is frequency shifted after passing through said counterpropagating light path;
means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by the environmental effect;

means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect, wherein said light path includes:

a length of optical fiber having first and second ends, and wherein said means for directing said second and third beams of light in opposite directions along a path to establish a counterpropagating light path for said second and third beams and said means capable of shifting the frequency between said second and third beams of light include:

a fiber spatial filter through which said first beam of light passes; and an acousto-optic modulator, said acousto-optic modulator having:

a front surface; and a back surface, said front surface being positioned to intercept said first beam of light out of said fiber spatial filter, said acousto-optic modulator when driven generating diffracted and non-diffracted beams of different frequency which are said second and third beams of light which pass out of said back surface to said first and second ends of said optical fiber respectively, after passing through said optical fiber where information is impressed thereon, said second and third beams of light pass out of said second and first ends respectively to said acousto-optic modulator where they are diffracted and a portion of each is passed back to said fiber spatial filter.

13. The optical device defined in claim 12 wherein said acousto-optic modulator includes:

a lens system associated with said front surface thereof; and a lens system associated with said back surface thereof, said front and back surface lens systems focusing said beams of light as they pass between said acousto-optic modulator and said optical fiber, and between said acousto-optic modulator and said fiber spatial filter.

14. An optical device which uses counterpropagating beams of light capable of sensing at least one environmental effect including:

a light source which produces a first beam of light;

means for splitting said first beam of light into at least second and third beams of light;

a light path, said light path being capable of having the environmental effect applied thereto;

means for directing said second and third beams of light in opposite directions along said light path to establish a counterpropagating light path for said second and third beams;

means capable of shifting the frequency between said second and third beams of light, said means being positioned in said second and third beams of light so that one of the beams is fredquency shifted prior to passing through said counterpropagating light path and the other is frequency shifted after passing through said counterpropagating light path;

means capable of varying nonreciprocal phase shift between said second and third beams of light positioned in said second and third beams of light so that one of the beams is varied prior to passing through said counterpropagating light path and the other is varied after passing through said counterpropagating light path;

means recombining said second and third beams of light into a fourth beam of light after said second and third beams of light have been directed along said counterpropagating light path;

means for detecting said fourth beam of light and producing therefrom an output indicative of phase shift induced by the environmental effect; and means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect, said means capable of varying nonreciprocal phase shift between said second and third beams of light including:

a polarizing beamsplitter cube having first, second, and third surfaces, said second beam of light being directed through said first surface and out of said second surface thereof with a predetermined polarization state and said third beam of light being directed through said third surface and out of said second surface thereof with a predetermined polarization state opposite from said predetermined polarization state of said second beam of light;

a quarter-wave plate positioned so that said second and third beams out of said second surface pass therethrough; and a variable etalon positioned to phase shift said second and third beams out of said quarter-wave plate and pass said phase shifted second and third beams back through said quarter-wave plate and said third and first surfaces of said polarizing beamsplitter cube respectively.

15. The optical device defined in claim 14 wherein said variable etalon includes:

a high reflectance mirror;

a partially reflective mirror positioned between said high reflectance mirror and said quarter-wave plate; and means to move said partially reflective mirror toward and away from said high reflectance mirror.

16. The optical device defined in claim 14 wherein said variable etalon includes:

a high reflectance mirror;

a partially reflective mirror positioned between said high reflectance mirror and said quarter-wave plate; and a electro-optic modulator positioned between said high reflectance mirror and said partially reflective mirror to vary the optical pathlength between said high reflectance mirror and said partially reflective mirror.

17. An optical device which uses counterpropagating beams of light capable of sensing at least one environmental effect including:

a light source which produces a first beam of light;

means for splitting said first beam of light into at least second and third beams of light;

a light path, said light path being capable of having the environmental effect applied thereto;

means for directing said second and third beams of light in opposite directions along said light path to establish a counterpropagating light path for said second and third beams;

means capable of shifting the frequency between said second and third beams of light, said means being positioned in said second and third beams of light so that one of the beams is frequency shifted prior to passing through said counterpropagating light path and the other is frequency shifted after passing through said counterpropagating light path, said means capable of shifting the frequency between said second and third beams of light including:

an acousto-optic modulator, said acousto-optic modulator having:

a modulator element with a first side, a second side at a right angle to said first side, a third side at a right angle different by the Bragg angle to said first side, and a fourth side, said first side being positioned in said first beam of light at a right angle different by the Bragg angle;

a first transducer mounted to said second side adjacent said first side being driven at a predetermined carrier frequency; and a second transducer mounted to said third side spaced from said first side being driven at said predetermined carrier frequency different by the shift frequency, whereby beams at the frequency of said first beam, at the frequency of said first beam plus said shift frequency and at the frequency of said first beam minus said shift frequency emanate out of said fourth surface in different predetermined directions;

means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by the environmental effect; and means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect.

18. The optical device defined in claim 17 wherein said means for directing said second and third beams of light in opposite directions along a path to establish a counterpropagating light path for said second and third beams include:

a length of optical fiber having first and second ends, said ends being aligned with said acousto-optic modulator so that said beams having the frequency of said first beam plus said shift frequency and having the frequency of said first beam minus said shift frequency pass into said first and second ends thereof.

19. An optical device which uses counterpropagating beams of light capable of sensing at least one environmental effect including:

a light source which produces a first beam of light;

means for splitting said first beam of light into at least second and third beams of light;

a light path, said light path being capable of having the environmental effect applied thereto;

means for directing said second and third beams of light in opposite directions along said light path to establish a counterpropagating light path for said second and third beams;

means capable of shifting the frequency between said second and third beams of light, said means being positioned in said second and third beams of light so that one of the beams is frequency shifted prior to passing through said counterpropagating light path and the other is frequency shifted after passing through said counterpropagating light path, said means capable of shifting the frequency between said second and third beams of light including:

an acousto-optic modulator, said acousto-optic modulator having:

a trapezoidal modulator element with a first side, a second side at a right angle different by the Bragg angle to said first side, a third side at a right angle different by the Bragg angle to said first side, and a fourth side parallel to said first side, said first side being positioned in said first beam of light at a right angle thereto;

a first transducer mounted to said second side adjacent said first side being driven at a predetermined carrier frequency; and a second transducer mounted to said third side spaced from said first side being driven at said predetermined carrier frequency different by the shift frequency, whereby a beam at the frequency of said first beam emanates out of said fourth surface at a right angle thereto, a beam at the frequency of said first beam different by said predetermined carrier frequency emanates out of said fourth surface at a right angle different by twice the Bragg angle, and a beam at the frequency of said first beam different by said frequency that said second transducer is driven emanates out of said fourth surface at a right angle different by twice the Bragg angle;

means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by environmental effect; and means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect.

20. The optical device defined in claim 19 wherein said means for directing said second and third beams of light in opposite directions along a path to establish a counterpropagating light path for said second and third beams include:

a length of optical fiber having first and second ends, said ends being aligned with said acousto-optic modulator so that said beams having the frequency of said first beam different by said predetermined carrier frequency and having the frequency of said first beam different by said frequency that said second transducer is driven pass into said first and second ends thereof respectively.

21. An optical device which uses counterpropagating beams of light capable of sensing at least one environmental effect including:

a light source which produces a first beam of light;

means for splitting said first beam of light into at least second and third beams of light;

a light path, said light path being capable of having the environmental effect applied thereto;

means for directing said second and third beams of light in opposite directions along said light path to establish a counterpropagating light path for said second and third beams;

means capable of shifting the frequency between said second and third beams of light, said means being positioned in said second and third beams of light so that one of the beams is frequency shifted prior to passing through said counterpropagating light path and the other is frequency shifted after passing through said counterpropagating light path, said means capable of shifting the frequency between said second and third beams of light including:

an acousto-optic modulator, said acousto-optic modulator having:

a modulator element with a first side, a second side at a right angle to said first side, a third side at a right angle to said first side, and a fourth side parallel to said first side, said first side being positioned in said first beam of light;

a first transducer mounted to said second side being driven at a predetermined carrier frequency; and a second transducer mounted to said third side being driven at said predetermined carrier frequency different by the shift frequency, whereby a beam at the frequency of said first beam emanates out of said fourth surface parallel to said first beam, a beam at the frequency of said first beam different by aid predetermined carrier frequency emanates out of said fourth surface at the Bragg angle from said first beam, and a beam at the frequency of said first beam different by said frequency that said second transducer is driven emanates out of said fourth surfaces at the Bragg angle from said first beam;

means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by the environmental effect; and means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect.

22. The optical device defined in claim 21 wherein said means for directing said second and third beams of light in opposite directions along a path to establish a counterpropagating light path for said second and third beams include:

a length of optical fiber having first and second ends, said ends being aligned with said acousto-optic modulator so that said beams having the frequency of said first beam different by said predetermined carrier frequency and having the frequency of said first beam different by said frequency that said second transducer is driven pass into said first and second ends thereof respectively.

23. An optical device which uses counterpropagating beams of light capable of sensing at least one environmental effect including:
   a light source which produces a first beam of light;
   means for splitting said first beam of light into at least second and third beams of light;
   a light path, said light path being capable of having the environmental effect applied thereto;
   means for directing said second and third beams of light in opposite directions along said light path to establish a counterpropagating light path for said second and third beams;
   means capable of shifting the frequency between said second and third beams of light, said means being positioned in said second and third beams of light so that one of the beams is frequency shifted prior to passing through said counterpropagating light path and the other is frequency shifted after passing through said counterpropagating light path, said means capable of shifting the frequency between said second and third beams of light including:
      an acousto-optic modulator, said acousto-optic modulator having:
         a modulator element with a first side, a second side at a right angle to said first side, a third side at a right angle to said first side, and a fourth side parallel to said first side, said first side being positioned in said first beam of light;
         a first transducer mounted to said second side being driven at a predetermined carrier frequency; and
         a second transducer mounted to said third side being driven at said predetermined carrier frequency different by the shift frequency, whereby a first modulator output beam at the frequency of said first beam, a second modulator output beam at the frequency of said first beam different by said predetermined carrier frequency, and a third modulator output beam at the frequency of said first beam different by said frequency that said second transducer is driven emanate out of said fourth surface at predetermined angles from said first beam;
   means capable of varying nonreciprocal phase shift between said second and third beams of light positioned in said second and third beams of light so that one of the beams is varied prior to passing through said counterpropagating light path and the other is varied after passing through said counterpropagating light path;
   means for recombining said second and third beams of light into a fourth beam of light after said second and third beams of light have been directed along said counterpropagating light path;
   means for detecting said fourth beam of light and producing therefrom an output indicative of phase shift induced by the environmental effect; and
   means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect.

24. The optical device defined in claim 23 wherein said means for directing said second and third beams of light in opposite directions along a path to establish a counterpropagating light path for said second and third beams include:
   a length of optical fiber having first and second ends, said ends being aligned with said acousto-optic modulator so that said beams having the frequency of said first beam different by said predetermined carrier frequency and having the frequency of said first beam different by said frequency that said second transducer is driven pass into said first and second ends thereof respectively.

25. An optical device which uses counterpropagating beams of light capable of sensing at least one environmental effect including:
   a light source which produces a first beam of light;
   means for splitting said first beam of light into at least second and third beams of light;
   a light path, said light path being capable of having the environmental effect applied thereto;
   means for directing said second and third beams of light in opposite directions along said light path to establish a counterpropagating light path for said second and third beams;
   means capable of shifting the frequency between said second and third beams of light, sand means being positioned in said second and third beams of light so that one of the beams is frequency shifted prior to passing through said counterpropagating light path and the other is frequency shifted after passing through said counterpropagating light path, said means capable of shifting the frequency between said second and third beams of light including:
      an acousto-optic modulator, said acousto-optic modulator having:
         a modulator element with a first side, a second side at a right angle different by the Bragg angle to said first side, a third side at a right angle different by five times the Bragg angle to said first side, and a fourth reflective side different by three times the Bragg angle to said first side, said first side being positioned at a right angle to said first beam of light;
         a first transducer mounted to said second side being driven at a predetermined carrier frequency; and
         a second transducer mounted to said third side being driven at said predetermined carrier frequency different by the shift frequency, whereby a first modulator output beam at the frequency of said first beam, a second modulator output beam at the frequency of said first beam different by said predetermined carrier frequency, and a third modulator output beam at the frequency of said first beam different by said frequency that said second transducer is driven emanate out of said first surface at predetermined angles from said first beam;
   means capable of varying nonreciprocal phase shift between said second and third beams of light positioned in said second and third beams of light so that one of the beams is varied prior to passing through said counterpropagating light path and the other is varied after passing through said counterpropagating light path;

means for recombining said second and third beams of light into a fourth beam of light after said second and third beams of light have been directed along said counterpropagating light path;

means for detecting said fourth beam of light and producing therefrom an output indicative of phase shift induced by the enviromental effect; and means connected to said means of detecting and said means capable of varying nonreciprocal phase shift between said second and third beams of light for compensating said output of said means for detecting to restore said output of said means for detecting to the phase relationship without the environmental effect by producing an output indicative of the degree of phase compensation and applying said output indicative of the degree of phase compensation to said means capable of shifting the frequency between said second and third beams of light, said output indicative of the degree of phase compensation also indicating the amount of environmental effect.

26. The optical device defined in claim 25 wherein said first beam enters said first surface at a right angle thereto, said first modulator output beam emanates out of said first surface at six times the Bragg angle, said second modulator output beam emanates out of said first surface at ten times the Bragg angle, and said third modulator output beam emanates out of said first surface at four times the Bragg angle.

27. The optical device defined in claim 25 wherein said means for directing said second and third beams of light in opposite directions along a path to establish a counterpropagating light path for said second and third beams include:

a length of optical fiber having first and second ends, said ends being aligned with said acousto-optic modulator so that said beams having the frequency of said first beam different by said predetermined carrier frequency and having the frequency of said first beam different by said frequency that said second transducer is driven pass into said first and second ends thereof respectively.

* * * * *

UNITED STATES PATENT AND TRADEMARK OFFICE
CERTIFICATE OF CORRECTION

PATENT NO. : 4,588,296                                    Page 1 of 2
DATED : May 13, 1986
INVENTOR(S) : Richard F. Cahill et al.

It is certified that error appears in the above—identified patent and that said Letters Patent is hereby corrected as shown below:

Column 1, line 8, the date "9 Nov. 1981" should be changed to --1 Mar. 1983--.

Column 5, line 27, the word "ohanges" should be --changes--.

Column 8, line 32, the word "frequenc" should be --frequency--.

Column 21, line 31, the word --deflected-- should be inserted after the word "beams".

Column 26, line 36, (Claim 1) the word --light-- should be inserted after the word "a", first occurrence.

Column 32, line 12, (Claim 14) the word "fredquency" should be --frequency--.

line 23, the word --for-- should be inserted after the word "means".

Column 36, line 28, (Claim 21) the word "surfaces" should be --surface--.

UNITED STATES PATENT AND TRADEMARK OFFICE
CERTIFICATE OF CORRECTION

PATENT NO. : 4,588,296

DATED : May 13, 1986

INVENTOR(S) : Richard F. Cahill et al.

It is certified that error appears in the above-identified patent and that said Letters Patent is hereby corrected as shown below:

Column 38, line 32, (claim 25) the word "sand" should be --said--.

Signed and Sealed this

Seventeenth Day of November, 1987

Attest:

DONALD J. QUIGG

Attesting Officer

Commissioner of Patents and Trademarks